United States Patent
Spencer

(10) Patent No.: US 9,344,367 B2
(45) Date of Patent: May 17, 2016

(54) SLIPSTREAM BANDWIDTH MANAGEMENT ALGORITHM

(71) Applicant: Barry Spencer, Falmouth, ME (US)

(72) Inventor: Barry Spencer, Falmouth, ME (US)

(73) Assignee: salesforce.com, inc., San Francisco, CA (US)

( * ) Notice: Subject to any disclaimer, the term of this patent is extended or adjusted under 35 U.S.C. 154(b) by 416 days.

(21) Appl. No.: 14/036,472

(22) Filed: Sep. 25, 2013

(65) Prior Publication Data

US 2014/0025777 A1    Jan. 23, 2014

Related U.S. Application Data

(62) Division of application No. 13/648,777, filed on Oct. 10, 2012.

(60) Provisional application No. 61/545,263, filed on Oct. 10, 2011.

(51) Int. Cl.
*H04L 12/801* (2013.01)
*H04L 12/825* (2013.01)
*H04L 12/805* (2013.01)
*H04L 12/853* (2013.01)
*H04L 12/841* (2013.01)

(52) U.S. Cl.
CPC .............. *H04L 47/10* (2013.01); *H04L 47/25* (2013.01); *H04L 47/2416* (2013.01); *H04L 47/283* (2013.01); *H04L 47/365* (2013.01)

(58) Field of Classification Search
CPC ............................. H04L 12/801; H04L 47/10
USPC .......... 709/217, 219, 226, 227, 228; 370/276, 370/321, 443
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

"An Exponential Time 2-Approximation Algorithm for Bandwidth"—Furer et al, PSU, Jun. 2009 http://www.cse.psu.edu/~kasivisw/bwapprox111120.pdf.*

*Primary Examiner* — Randy Scott
(74) *Attorney, Agent, or Firm* — Blakely Sokoloff Taylor & Zafman LLP

(57) ABSTRACT

In accordance with disclosed embodiments, there are provided methods, systems, and apparatuses for implementing a slipstream bandwidth management algorithm including, for example, means for executing an application a computing device, in which the application is to communicate with a remote computing device over a public Internet; means for approximating outgoing bandwidth for communications from the computing device to the remote computing device; means for approximating incoming bandwidth for communications received at the computing device from the remote computing device; means for allocating multiple simultaneous Transmission Control Protocol (TCP) connections in support of the application based at least in part on the approximated outgoing bandwidth and based further on the approximated incoming bandwidth; and means for iteratively adjusting bandwidth communicated for the application between the computing device and the remote computing device based at least in part on latency between the computing device and the remote computing device. Other related embodiments are disclosed.

24 Claims, 9 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,571,181 B2 * | 8/2009 | Rhodes ............... H04L 43/0879 |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0089250 A1 * | 4/2008 | Jung ................... H04L 1/0028 370/276 |
| 2011/0072366 A1 | 3/2011 | Spencer et al. |

* cited by examiner

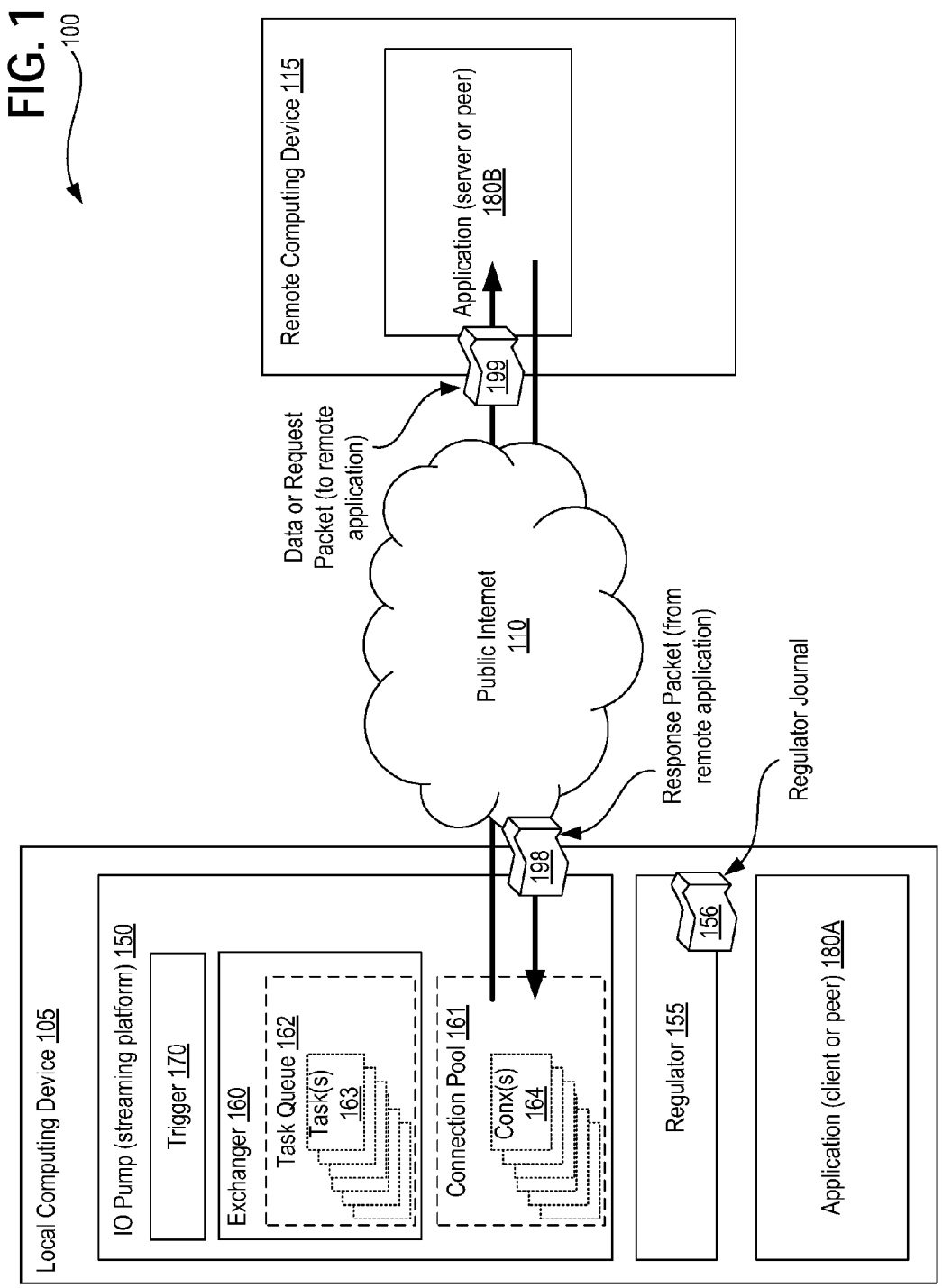

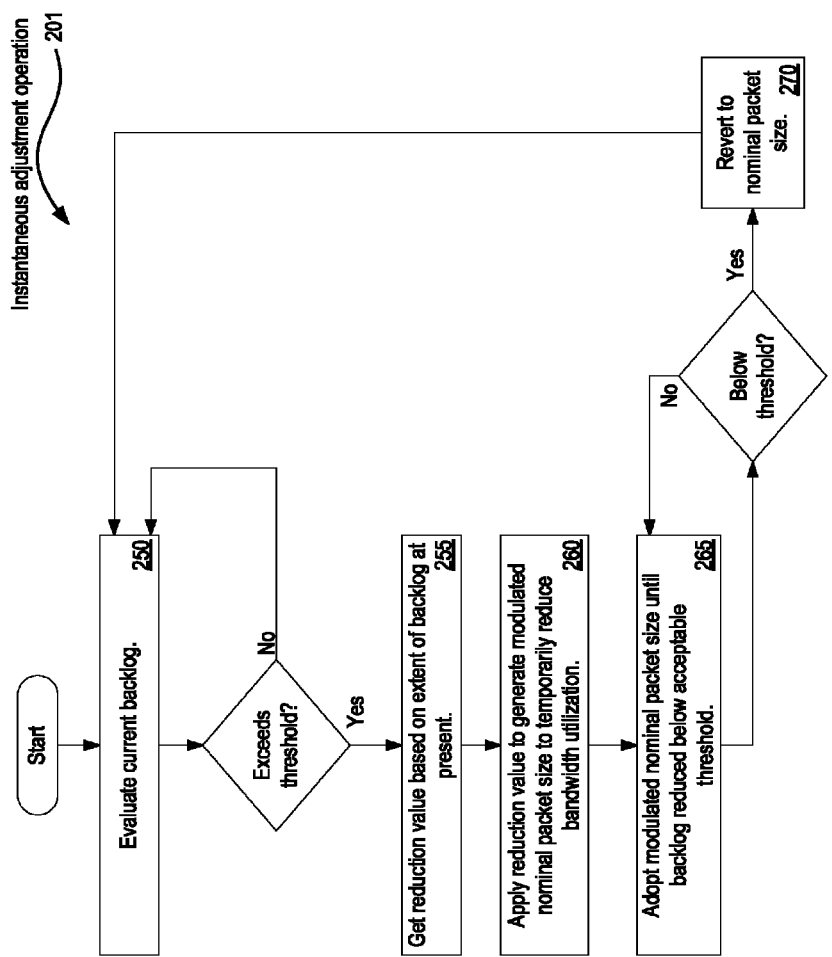

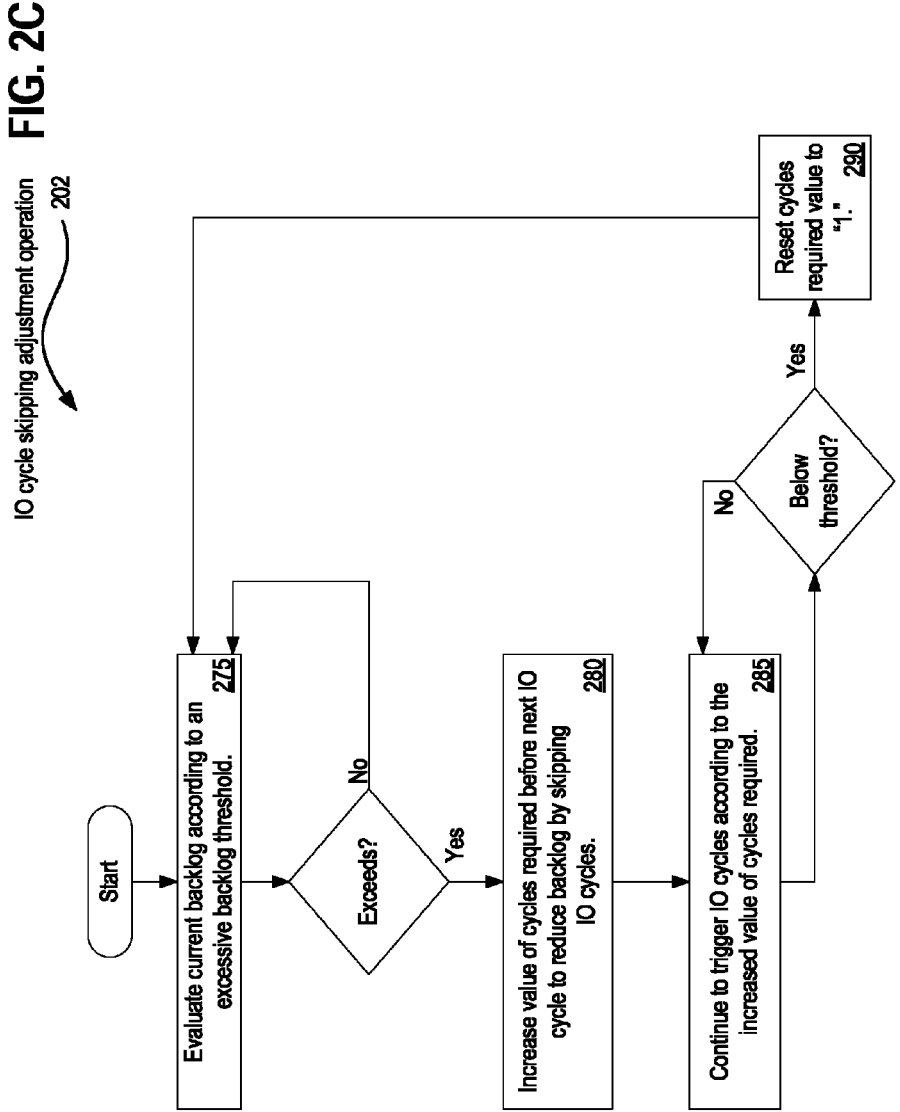

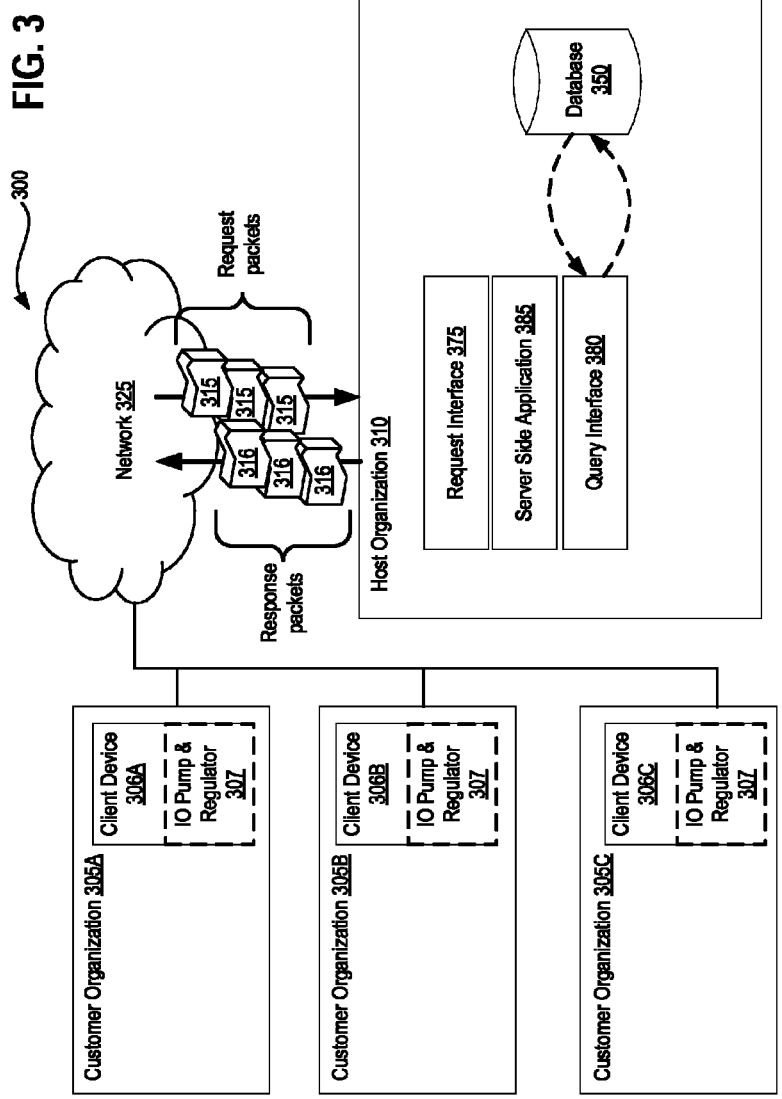

SLIPSTREAM BANDWIDTH MANAGEMENT ALGORITHM

CLAIM OF PRIORITY

This application is related to, and claims priority to, the utility application entitled "Slipstream Bandwidth Management Algorithm," filed on Oct. 10, 2012, having an application Ser. No. 13/648,777, the entire contents of which are incorporated herein by reference; and the provisional utility application entitled "Slipstream Bandwidth Management Algorithm," filed on Oct. 10, 2011, having an application No. 61/545,263, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to systems, methods, and apparatuses for implementing a slipstream bandwidth management algorithm.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

Communicating data over the Internet or other networks is handled via protocols. Several exist including, for example, TCP, UDP, RTP, etc.

The Transmission Control Protocol (TCP) is a protocol of the Internet Protocol Suite and one of two original components of the suite, complementing the Internet Protocol (IP), and, which is commonly referred to as TCP/IP representing both the TCP and IP protocols. The TCP protocol places a premium upon reliability and data integrity, and is used by major Internet applications such as World Wide Web browsers, email applications, remote administration, and file transfer, each of which depend upon accuracy of the data transfer operation. Conversely, applications which do not require reliable data transfers, may use the User Datagram Protocol (UDP), which provides a datagram service that emphasizes reduced latency over reliability, thus making data loss an acceptable operational characteristic in the pursuit of reduced latency.

Due to network congestion, traffic load balancing, or other unpredictable network behavior, packets can be lost, duplicated, or delivered out of order. The TCP protocol detects these problems, requests retransmission of lost data, and rearranges out-of-order data. Once the TCP receiver has reassembled the sequence of octets originally transmitted, it passes them to the application program. Thus, TCP abstracts the application's communication from the underlying networking details.

TCP is optimized for accurate delivery rather than timely delivery, and therefore, TCP sometimes incurs relatively long delays (in the order of seconds) while waiting for out-of-order messages or retransmissions of lost messages. It is not particularly suitable for real-time applications such as Voice over IP. For such applications, protocols like the Real-time Transport Protocol (RTP) running over the User Datagram Protocol (UDP) are customarily utilized.

The RTP protocol defines a standardized packet format for delivering audio and video over IP networks. RTP is used extensively in communication and entertainment systems that involve streaming media, such as telephony, video teleconference applications, television services and web-based push-to-talk features.

Unfortunately, the RTP protocol which is utilized by conventional applications for providing real-time or low-latency type streaming applications is wholly deficient to provide traversal mechanisms through varying network layers, traversal means for firewalls, and traversal means for crossing disparate network architectures, so as to establish a link between two remote computing devices, such as a client/server or peer-peer, etc., whereas such features are provided by the TCP protocol. Unfortunately, the TCP protocol is also unsatisfactory for real-time and low latency applications due to the unacceptable latency delay introduced through its use.

The present state of the art may therefore benefit from methods, systems, and apparatuses for implementing a slipstream bandwidth management algorithm as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architecture in accordance with described embodiments;

FIG. 2B is a flow diagram illustrating another method for adapting bandwidth utilization via a regulator's adaptation of nominal packet size in accordance with disclosed embodiments;

FIG. 2C is a flow diagram illustrating another method for adapting bandwidth utilization via a regulator's adaptation of nominal packet size in accordance with disclosed embodiments;

FIG. 3 depicts an alternative exemplary architectural overview of the environment in which embodiments may operate;

DETAILED DESCRIPTION

Figure 2A:
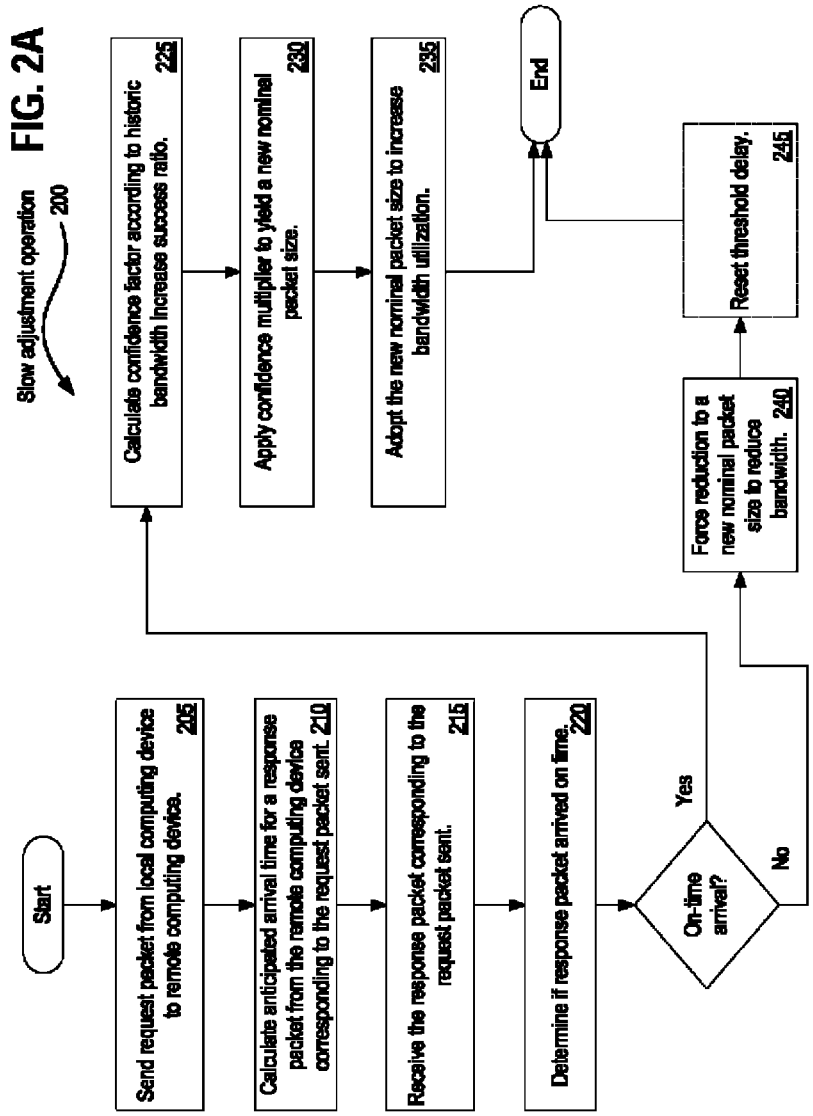
FIG. 2A is a flow diagram illustrating a method for adapting bandwidth utilization via a regulator's adaptation of nominal packet size in accordance with disclosed embodiments.

Described herein are systems, devices, and methods for implementing a slipstream bandwidth management algorithm in an on-demand service environment.

In one embodiment, such means include: means for executing an application a computing device, in which the application is to communicate with a remote computing device over a public Internet; means for approximating outgoing bandwidth for communications from the computing device to the remote computing device; means for approximating incoming bandwidth for communications received at the computing device from the remote computing device; means for allocating multiple simultaneous Transmission Control Protocol (TCP) connections in support of the application based at least in part on the approximated outgoing bandwidth and based further on the approximated incoming bandwidth; and means for iteratively adjusting bandwidth communicated for the application between the computing device and the remote computing device based at least in part on latency between the computing device and the remote computing device.

Generally speaking, streaming data from client computer on the Internet, including those operating from within private networks, to a server located on a data center is a technologically complex problem, and one which typically requires different and customized solutions depending on the varying network structures, firewalls, and protections which must be traversed by the data to be streamed.

Conventional solutions utilize the Real-time Transport Protocol (RTP) to implement data streaming for real-time and low latency applications, however, the use of RTP mandates certain undesirable complexities. For instance, with the use of RTP, it is necessary to open up ports on both sides, for instance, the client side and the server side, as well as perform firewall traversal. Unfortunately, the technical operations for opening up such ports and traversing firewalls is inconsistent, which results in a software application which utilizes the RTP protocol, having to implement various schemes and configurations so as to support and establish a stream capable connection between such devices.

These varying and inconsistent schemes prove to be laborious to develop, error prone as firewall and network configuration technologies change, and limited in scope as they fail to account for all potential client/server or peer to peer combinations in a comprehensive manner, thus leaving certain configurations unsupported.

In a real-time or low latency streaming application, the general objective may be characterized as creating a connection between two devices (e.g., client/server or peer/peer) such that the application may communicate as much data between the devices, with as little latency as possible, in the most reliable manner feasible. For an application developer seeking to implement such real-time or low latency application, the ability to create as comprehensive of a connection scheme as possible, as simply as possible, is another important consideration.

When communicating data over the public Internet, further challenges are encountered which are not present in switched circuit networks. For example, data which traverses a switched circuit network enjoys a guaranteed amount of bandwidth. Conversely, data traversing the public Internet encounter an environment in which the actual and practical amount of bandwidth available to a given application is changing constantly.

So as to overcome these problems, means are taught herein for implementing a slipstream bandwidth management algorithm which enables an application or agent operating at a computing device to employ real-time and/or low latency communications over the public Internet in such a way that the applications connection schemes behave like a World Wide Web browser and appear to the client's operating system as a browser, insomuch as the connection schemes are considered, and thus, the application is able to send data to a remote server or peer and receive data back from the remote server or peer, in much the same way that a browser application may operate. Unlike a browser application however, novel means are employed to ensure low latency, solving a deficiency of the TCP protocol, and further to ensure data accuracy and reliability, solving a deficiency of the RTP protocol.

The TCP protocol is utilized to support connections over the public Internet between remote computing devices, despite the fact that TCP is widely disfavored for implementing real-time and low latency applications such as VoIP and audio or video sharing applications in favor of the RTP protocol. The TCP protocol is disfavored by conventional wisdom because it cannot support bi-directional communications, thus, a client/server or peer to peer connection via TCP does not support both sending and receiving simultaneously. The TCP protocol is further disfavored by conventional wisdom while packet losses are addressed in a favorable manner for browser applications, the same packet loss handling mechanisms are extremely problematic for real-time and low latency applications because lost packets will be re-transmitted at different time delays causing unpredictable latency between packets.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In particular, a local computing device 105 and a remote computing device 115 are depicted, each of which are communicatively linked such that they communicate via the public Internet 110. The local computing device 105 may operate as a client or a peer, but nonetheless, benefits from the implementation of the Input/Output pump 150 (also referred to as the "I/O pump" or "TO pump" or a "streaming platform") at the local computing device 105, which enables the methodologies described herein.

According to one embodiment, the architecture 100 for implementing such an I/O pump 150 may be utilized for performing bidirectional low latency, lossless, high bandwidth streaming using the TCP/IP protocol (Transmission Control Protocol/Internet Protocol).

As shown here, the I/O pump includes the trigger 170, exchanger 160 having the task queue 162 therein for managing multiple queued tasks 163, and further includes the connection pool 161 having connections 164 therein. A regulator 155 is depicted which cooperatively operates with the I/O pump 150, for example, to monitor and control the I/O Pump 150. Application 180A at the local computing device 105 exchanges data (e.g., request packets 199 and response packets 198) over the public Internet 110 with the application 180B at the remote computing device 115. The respective applications 180A/B may form a client/server relationship or a peer to peer relationship.

According to one embodiment, there is a computing device (e.g., local computing device 105), having a processor therein to execute an application 180A, the application 180A being operable to communicate with a remote computing device 115 over a public Internet 110. According to such an embodiment, the computing device further embodies a regulator module 155 to approximate outgoing bandwidth for communications from the computing device 105 to the remote computing device 115, and in which the regulator module 155 is to further approximate incoming bandwidth for communications received at the computing device 105 from the remote computing device 115. According to such an embodiment, an input/output (I/O) pump 150 of the computing device 105 allocates multiple simultaneous Transmission Control Protocol (TCP) connections 164 in support of the application 180A based at least in part on the approximated outgoing bandwidth and based further on the approximated incoming bandwidth; and in which the regulator module 155 further iteratively adjusts bandwidth communicated (e.g., based on packets 198 and 199, nominal packet size etc.) for the application between the computing device 105 and the remote computing device 115 based at least in part on latency between the computing device and the remote computing device.

In another embodiment of the computing device, the I/O pump 150 is to allocate the multiple simultaneous TCP connections 164 in support of the application 180A includes a connection pool 161 of the I/O pump 150 to maintain the multiple simultaneous TCP connections 164.

In another embodiment of the computing device 105, a trigger 170 of the I/O pump 150 is to iteratively trigger transmission of request packets 199 from the computing device 105 to the remote computing device 115 according to a configured value for time between I/O transmission cycles.

In another embodiment of the computing device, an exchanger 160 of the I/O pump 150 is to queue pending request packets awaiting transmission from the computing device to the remote computing device within a task queue 162; and in which the exchanger is to further match pending request packets (e.g., tasks 163 yet to be transmitted) in the task queue 162 to one of the multiple simultaneous TCP connections 164 within a connection pool 161 having an available state to transmit the pending request packets to the remote computing device 115 via the multiple simultaneous TCP connections 164.

In another embodiment of the computing device 105, the application 180A executing on the computing device includes one or more of the following application types: a real-time communications application; a low latency communications application; a Voice over Internet Protocol (VoIP) application; an audio streaming application; a video streaming application; a bi-directional audio streaming application; a video streaming application; a screen sharing application; and a web-cam audio/video application.

Consistent with the embodiments described herein, the following terminology is used throughout this document:

A Client Clock is a tool that reports elapsed time since the client started, in milliseconds.

A Server Clock is a tool that reports the elapsed time since the server started, in milliseconds. According to one embodiment, the elapsed time reported from the server clock is biased by $2^{\wedge}63$.

A Clock Synchronizer is a tool that synchronizes the Server Clock with the Client Clock. In one embodiment, a relatively constant degree of error is present and an offset may be applied as part of the synchronization.

A connection pool 161 is an array of TCP connections 164 between the local computing device 105 and the remote computing device 115, for example, between a client and a Media Server, between peers in a VoIP or audio/video sharing application, etc.

Elapsed Transmission Time is the amount of time it takes for a Request Packet to travel one way from the local computing device 105 to the remote computing device 115.

Elapsed Receive Time is the amount of time it takes for a Response Packet to travel one way from the remote computing device 115 to the local computing device 105.

Emergency Multiplier is a value that is multiplied by Nominal Bandwidth to affect drastic, instantaneous, but temporary changes to the packet sizes used by the I/O Pump 150.

Exchange Tasks are objects that can be added to the task queue 162 as tasks 163 to drive the latter stages of an I/O Cycle, not including Packing operations.

A request packet 199 is a packet containing an Exchange Header and application data that is sent from the local computing device 105 to the remote computing device 115, eliciting a response packet 198 from the remote computing device 115.

The response packet 198 is a packet containing an Exchange Header and application data that is sent from the remote computing device 115 to the local computing device 105 in response to a request packet 199.

The Exchanger 160 is a module at the local computing device 105 (e.g., client side) responsible for sending data, such as request packets 199, to the remote computing device 115 and for receiving a response packet 198 from the remote computing device 115.

An I/O Cycle is a process for creating (also referred to as Packing) a request packet 199 from application 180A data, transmitting the request packet 199 to the remote computing device 115, receiving a response packet 198 from the remote computing device 115, and sending the returned data received via the response packet 198 back to the application 180A.

I/O depth represents the number of connections 164 in the connection pool 161 that are currently active, and may further include the connections 164 that are soon-to-be active. Thus, state information may further be maintained for connections 164 within the connection pool 161. I/O depth information may be maintained outside of the connection pool 161.

The I/O Pump 150 represents the implementation of modules at the local computing device 105, such as at a client side, to implement the streaming platform described herein, including modules and functionality for implementing the trigger 170, exchanger 160, connection pool 161, and other described features. Notably, an I/O pump 150 is not required at the remote computing device (e.g., at the server side or at the device of a remote peer), though one may exist.

Modulated Nominal Bandwidth represents Nominal Bandwidth multiplied by a scaling factor, in which the scaling factor (e.g., such as an Emergency Multiplier, etc.) is used to quickly clear backlogs based on the current number of I/O Cycles that are both overdue and incomplete.

Nominal Bandwidth represents the regulator's 155 approximation (e.g., a best guess according to its algorithms and available data) as to the amount of inbound and outbound bandwidth available for receiving and transmitting response packets 198 and request packets 199 respectively. Nominal Bandwidth may be limited as to the accuracy of the approximation because: (1) Nominal bandwidth may not measure bandwidth levels that exceed the bandwidth levels tested, and (2) Nominal Bandwidth may function as a forecasting mechanism only, insomuch that levels approximated may prove to be higher or lower than the forecast. Deviations from the forecast may, however, be utilized to further refine the Nominal Bandwidth which is approximated by the regulator 155 after each I/O cycle completes.

Bandwidth approximation is necessary for the up and the down (e.g., outbound and inbound) directions individually, because the potential bandwidth capacity may differ for the respective directions, and it is desirable to optimize the transmission in each direction in support of improved quality for audio/video/VoIP applications, etc., as well as for the sake of reduced latency which negatively affects such applications. Failure to provide good approximation of the bandwidth may underutilize available bandwidth, or potentially worse, over utilize available bandwidth resulting in every node, hop, or network device between the local computing device and the remote computing device along the path(s) to begin buffering data, which in turn exacerbates latency problems.

Packet Size Limits are values calculated by functionality at the local computing device (e.g., via a Bandwidth Limiter tool). The packet size limits may additionally reflect Inbound and Outbound Packet Size Limits based on the configuration of the remote computing device 115, which may be outside of the scope of control for the I/O pump 150, but may nevertheless be accommodated by the I/O pump 150 through algorithmic changes at the local computing device 105.

Packing is process of creating a request packet 199 which is to be sent to the remote computing device 115.

A Bandwidth Calculator may be utilized to calculate Nominal Bandwidth.

Potential Throughput represents the maximum unidirectional data rate that could be achieved based on the configuration, paths, and other constraints affecting transmission of data through the public Internet 110 upon which the request packets 199 and response packets 198 are transported between the local and remote computing devices.

The Regulator 155 is a module at the local computing device 105 that works in a cooperative manner with the I/O pump 150 to regulate the flow of traffic between the local computing device 105 and the remote computing device 115.

A Regulator Record is a collection of metrics representing the timing and progression of a single I/O Cycle.

Round Trip Transmission Time represents the amount of time it takes to transmit a Request Packet 199 to the remote computing device 115 and receive a response packet 198 at the local computing device 105 for the corresponding request packet 199 sent.

The task queue 162 contains two arrays; (1) an array of task objects that inherit from a 'Task' class, and (2) an array of threads. When a task 163 is available, and a thread is not in use, a thread is assigned a particular task 163. The thread will then call the task's 163 execute function. When the execute function completes, the task 163 is removed from the task queue's 162 array of task objects.

A Traffic Report, also referred to as a 'Regulator Record' is a collection of metrics representing the timing and progression of a single I/O Cycle.

The trigger 170 is a module at the local computing device 105 responsible for initiating I/O Cycles.

Unpacking is the process of reading a response packet 198 and dispatching its contents to the application 180A.

Provisioning of the described I/O Pump 150 onto capable computing devices provides for a real-time media transport that maximizes bandwidth utilization while maintaining the minimum amount of latency feasible and further minimizing the effects of packet loss and jitter. Implementation of such an I/O Pump 150 is reliable in its exchange of data between remote and physically separated applications 180A/B operating on local and remote computing devices. Furthermore, the I/O Pump 150 provides scalability by supporting remote connectivity over the public Internet 110 through widely available support of the TCP/IP protocol, and yet overcomes TCP/IP's well known shortcomings when it comes to supporting real-time and low latency types of media applications including, for example, VoIP, audio sharing, video sharing, and screen sharing.

Further still, the I/O Pump may be utilized effectively over disparate transport means including, for example, Cable Internet, DSL (Digital Subscriber Line), Fiber Optics (e.g., FiOS™), Wireless, WiFi, LTE, 4G, 3G, satellite, etc., so long as the transport means supports TCP/IP protocol, which is ubiquitous on the aforementioned transports. Further still, varying configurations of network architectures, firewalls, corporate and government networks, etc. are supported and traversable.

The I/O Pump 150 is tolerant, by its design, to fluctuating bandwidth and other varying network conditions prevalent on the public Internet 110, even where such fluctuations and variations occur during a single streaming session between the exemplary local computing device 105 and remote computing device 115.

Accordingly, the I/O Pump 150 operates according to the various embodiments to support: sending streams of application data from one local computing device 105 to a remote computing device 115 via a central media server operating as the remote computing device 115; sending streams of application data from one local computing device 105 to a group of other clients via a remote computing device 115; maximizing I/O throughput to and from a remote computing device 115; minimizing end-to-end latency between the local and remote computing devices; minimizing effects of packet loss; and minimizing effects of TCP I/O failures.

Consistent with embodiments described herein, any or all of the following characteristics, criteria, thresholds, and attributes may be present: (a) the I/O Pump 150 may open and maintain multiple simultaneous TCP/IP connections 164 originating at the local computing device 105 and terminating at the remote computing device 115 on behalf of a single application 180A; (b) connections 164 may close on their own or self-terminate due to network errors at a rate not to exceed once per five (5) seconds according to exemplary embodiments; (c) in the event of network error, it may be unknown whether or not a given request packet 199 was received by the remote computing device 115; (d) networks associated with either the local computing device 105 and/or the remote computing device 115 may utilize any of firewalls, NAT (Network Address Translation) schemes, and/or proxy servers; and (e) a maximum TCP failure rate of 1% (based on 50 ms I/O cycles and calculated using a two (2) second moving average) may be employed.

According to an exemplary embodiment, a potential throughput is the maximum data rate achievable between the local computing device 105 and the remote computing device 115 based on the configuration, paths, and other constraints represented by the network as expressed in bits per second, and may further vary as higher or lower depending on the application 180A/B, according to which: (a) a required minimum potential outbound throughput is established as an exemplary 256 Kbps (e.g., with 1 second moving average); and (b) a required minimum potential inbound throughput is established as an exemplary 384 Kbps (e.g., with a 1 second moving average).

In one embodiment, the minimal round trip latency or minimal round trip transmission time represents the amount of time it takes to transmit, via TCP/IP, a minimal sized request to the remote computing device 115 and receive a minimal sized response at the local computing device 105, assuming no packet loss and minimal jitter.

According to such an exemplary embodiment, the minimal round trip latency is a arrived upon according to: (a) the elapsed time to transmit from the local computing device 105 to the remote computing device 115; (b) the elapsed time before the remote computing device 115 responds and (c), the elapsed time to transmit from the from the remote computing device 115 to the local computing device 105. According to one embodiment, the minimal round trip latency is tracked by the streaming platform according to observation over a rolling three (3) minute historical period. In an exemplary embodiment, required minimal round trip latency is established as 700 ms according to a three-minute moving minimum.

According to one embodiment, packet loss occurs when one or more packets (198 and 199) of data traversing the public Internet 110 between applications 180A/B of the local and remote computing devices fail to reach their destination. Such packets may be lost in either the inbound or outbound directions. According to embodiments of the I/O pump 150 transmitting via the TCP/IP protocol, such packet loss will be exhibited as delayed transmissions. Thus, according to exemplary embodiments, a required maximum average total packet loss is established as an exemplary 3% with a 1-second moving average of inbound packet loss plus 1-second moving average of outbound packet loss.

According to the described embodiments, jitter is the deviation from periodicity for elapsed transmission times. Consistent with use of the described I/O Pump 150, jitter may manifest as a deviation in round trip latency, which may be due to: (a) network jitter on the path from the local computing device 105 to the remote computing device 115 via the public Internet; (b) network jitter on the path from the remote computing device 115 to the local computing device 105 via the public Internet; (c) packet losses for request and/or response packets (198 and 199); and/or (d) variations in available bandwidth for transmitting data via the public Internet 110. According to an exemplary embodiment, required maximum average jitter is established at an exemplary 100 ms with a 1-second moving average.

According to the various embodiments, implementation of the described I/O pump 150 accounts for the following advantages with respect to protocol choice, layered implementation, and bandwidth/latency management.

Regarding the protocol choice for use with the described I/O Pump 150, TCP/IP is the most widely distributed and supported application protocol on the Internet. Due to its vast adoption and support, programmers' designs which rely upon client-server or peer-to-peer communications via TCP/IP do not need to solve specific network related challenges, such as firewall, proxying, and NAT traversal. Accordingly, use of TCP/IP, as opposed to RTP, lends itself to a top-down design in which challenges like packet loss and bandwidth limitations are solvable through software without being constrained by the design and availability of existing network standards.

Conventional wisdom dictates that TCP/IP is not a reliable platform for real-time and low latency communications. However, the limitations of TCP/IP can be addressed through provisioning and use of the described I/O Pump 150 and the complementary methodologies described herein. The limitations of TCP/IP cited in support of favoring RTP protocol over TCP/IP for low latency and real-time applications included at least the half-duplex nature of TCP/IP, insomuch that when using a TCP/IP connection, the network is either transmitting data to the server, or receiving data from the network, or doing nothing at all, but it is not simultaneously transmitting in both directions. In support of low latency and real-time applications envisioned for use with the described I/O pump 150, it is necessary to transmit data continuously in both directions, thus lending credence to the conventional wisdom against selecting the TCP/IP protocol.

The problem of the half-duplex nature of TCP/IP (or non bi-directional) is solved by the I/O Pump 150 implementing multiple simultaneous connections 164, and using such a series of connections 164 for transmissions via the I/O pump, it is then permissible for a first connection to be sending, while a different second connection 164 is receiving, and still another connection 164 may be blocked waiting for a response packet 198 from the remote computing device. To be clear, the multiple simultaneous connections 164 are allocated by the I/O Pump 150 for a single application 180A, whereas conventional methodologies do not allocate and manage such a series of TCP/IP connections in support of a single application 180A in the manner described for the I/O Pump 150. Unfortunately, TCP offers no mechanism whatsoever by which such multiple simultaneous TCP connections may be managed, and thus, the teachings described herein must be employed to appropriately allocate, utilize, and manage the multiple simultaneous TCP connections proposed for such a single executing application 180A.

Because packet loss causes TCP retransmissions when utilizing TCP/IP, the transmission of real-time data via TCP/IP could be subjected to excessive delays associated with such packet loss and retransmission thus interfering with such real-time transmissions, and again, lending credence to the conventional wisdom against selecting TCP/IP. Nevertheless, through the I/O Pump's 150 utilization of multiple simultaneous connections 164, the regulator 155 functionality monitoring the I/O pump's 150 transmissions detects excessive delays and retransmit data using a different connection 164, supplanting the retransmission functionality of the TCP/IP protocol stack with its own. Failure to supplant the re-transmission operation of conventional TCP protocol operation conflicts with the advantages of the I/O pump 150 and regulator's 155 ability to reduce latency while also using the TCP protocol.

Regarding the layered implementation of the design, the described slipstream bandwidth management algorithm may be considered to have the following layers of interaction (also conceptually referred to as compartmentalized responsibilities):

At a lowest layer, provisioning of the I/O pump 150 is utilized most simply to facilitate the maximum number of bytes bi-directionally between the local computing device 105 and the remote computing device 115, with the least latency, and overcoming the effects of packet loss through use of the regulator's monitoring capabilities to recognize and re-transmit data packets as necessary, supplanting the TCP/IP's retransmission functionality which is considered inadequate due to its undesirable latency inducing effects.

At a next higher layer, functionality of the I/O pump 150 prioritizes and multiplexes streams of data via packing and unpacking operations between the local computing device and remote computing device respectively.

At another conceptual layer, functionality of the I/O pump 150 provides sequencing, such as lossy sequencing allowing lower latency when packet loss exists or lossless sequencing exhibiting higher latency when packet loss exists, or no sequencing at all, depending on implementation considerations.

Further conceptual layers of functionality include formatting and addressing of packets by taking application data and turning it into a series of objects and visa versa, encoding/decoding and compression/decompression, as necessary, and bandwidth/latency management, for instance, implemented at a higher application layer or on behalf of the application layer and visible thereto.

Controlling the I/O pump 150 is provided through parameters. For instance, predictable operation of the I/O pump 150 may be realized through establishing a minimal set of operational parameters, such as (a) the speed of the pump (cycles per second, or interval); (b) input packet size; and (c) output packet size. In addition to the I/O pump 150 operating in a predictable and easily controllable manner, the I/O pump may further accommodate various telemetry data reporting operational characteristics, at least some of which may be utilized by the I/O pump 150 itself to further refine its operational efficiency, for instance, by adapting to changes in actual transmission throughput via the public Internet 110 to a remote computing device. According to one embodiment, the I/O pump 150 self selects optimal packet sizes based on the telemetry data observed.

According to one embodiment, the I/O Pump 150 may operate to facilitate transmission of data both to and from the remote computing device. The I/O pump 150 may utilize a fixed-sized pool of TCP connections (connection pool 161), and a fixed-size pool of threads (contained in the Exchanger 160) to maintain the continuous flow of data both to and from the remote computing device. According to embodiments, every I/O cycle involves two different packets, the packet which travels to the remote computing device 115 being the request packet 199 and the response from remote computing device 115 being the response packet 198.

According to one embodiment, the connection pool 161 is an array of TCP connections from the local computing device 105 to the remote computing device 115. In such an embodiment, the connections 164 may exist in one of three states; closed, busy or available. A closed state indicates the connection to remote computing device 115 is currently closed. A busy state indicates the connection 164 to remote computing device 115 is open, but is currently in use and awaiting a reply. An available state indicates the connection 164 to the remote computing device 115 is open, and is not in use, thus being immediately available for use.

On request, the connection pool 161 is capable of performing a send/receive operation using an available connection 164. If an available connection 164 is not found in the array, then the connection pool will open a closed connection 164, thus transitioning the connection from closed to available. If there are not any closed connections available, then the connection pool 161 will return an error code (ssTransport::ConnectionPoolBusy), according to certain embodiments.

By opening up multiple connections and using them in the aggregate for a single application, the I/O pump 150, effectively produces one sufficient connection utilizing the TCP/IP protocol as a base, whereas TCP/IP alone fails to accommodate the requirements of real-time and low latency applications, including bi-directional capabilities not provided by the TCP/IP stack, such that an application can receive and send in real-time in both directions, with minimal latency, and still allow for redundancy, lossy or lossless, as appropriate, through the provisioning and use of the I/O pump 150. Whereas TCP/IP exchange normally dictates the opening of just one connection per exchange/interaction the I/O pump and complementary modules provides the necessary management and scheduling operations to utilize the multiple simultaneously active connections. These connections will grow overtime, as managed by the I/O pump and its regulator, until an optimal quantity needed for a given application and usage is reached.

To minimize the impact of the opening connections on bandwidth calculations, during initialization, the connection pool 161 will pre-open a predetermined number of connections according to certain embodiments. For instance, configuration parameters may dictate that an exemplary 20 connections be pre-opened or pre-allocated at startup.

According to one embodiment, the connection pool 161 includes ability to fully abort a specific transmission after a certain amount of time has passed. Such functionality treats the transmission as an I/O failure and responsively causes a subsequent retransmission, thus supplanting the retransmission functionality of standard TCP/IP, unless the retransmission has already occurred via the TCP/IP implementation before the connection pool 161 triggers its own threshold abort time.

According to one embodiment, the Exchanger 160 facilitates the process of Exchanging packets with the remote computing device, thus providing 'upload data' in the request packet 199 and receiving 'download data' in the response packet 198 sent from the remote computing device as its reply.

According to one embodiment, the exchanger 160 transmits request packets 199 to the remote computing device 115 by using a connection 164 in the connection pool 161. In such an embodiment, in addition to application data transmitted, request packets 199 also contain a value for a request packet size and by transmitting the request packet 199, the exchanger 160 is both (a) delivering application data to the remote computing device 115 and (b) requesting a response packet 198 conforming to a specified response packet size.

According to one embodiment, receiving a response packet 198 further includes unpacking and dispatching the application data received in the response packet 198 to an originating application, such as a client or peer application 180A executing at the local computing device 105.

The exchanger 160 may inherit from a 'task queue' 162 class, in which case the exchanger's 160 task queue 162 maintains an array of exchange tasks 163 and dispatches such exchange tasks 163 to an array of task threads available to the exchanger 160. An Exchanger::Exchange method may serve as an entry point for the exchanger 160, responsible for creating an exchange task 163 and adding it to the exchanger's task queue 162, thus enabling the exchanger 160 to pair individual threads available to the exchanger 160 with connections 164 from the connection pool 161 to drive I/O between the local computing device 105 and the remote computing device 115.

According to one embodiment, the trigger 170 is responsible for initiating the exchange process via its own trigger thread. The trigger's 170 thread may execute at a regular interval, such as an exemplary 50 ms, in which each execution cycle consists of at least two operations: (a) an operation for assembling request packets 199 using a request packet size and queued application data from the application 180A, in which the request packet size may vary over time being calculated and adapted by the regulator 155 module (referred to also as the modulated nominal outbound packet size; and (b) an operation for invoking the exchanger's method, thereby queuing an I/O cycle.

As a result of the trigger's 170 iterative cycles, the I/O pump's 150 exchange process occurs at an interval that is independent of round-trip-latency, in which the I/O pump 150 is capable of overlapping I/O, meaning additional request packets 199 can be triggered and sent to a remote computing device before a response packet 198 for a previously sent request packet 199 arrives at the local computing device, thus enabling the I/O pump to drive data transfer continuously for both inbound and outbound transmissions.

According to an embodiment, the number of pending TCP requests, referred to as the I/O depth, starts at zero and increases each time a request is made, and decreases each time a reply is received. By calculating the optimal values for request packet size (e.g., the modulated nominal outbound packet size) and response packet size (e.g., the modulated nominal inbound packet size), the I/O pump 150 is able to fully exploit all available throughput in both directions, as such throughput is available between the local and remote computing devices when communicating via the public Internet 110.

According to one embodiment, the regulator 155 cooperatively operates in tandem with the I/O Pump to regulate the flow of traffic between the local computing device 105 and the remote computing device 115. For instance, the regulator 155 may be responsible for (a) helping the I/O Pump maximize throughput to and from the remote computing device 115; and (b) helping the I/O Pump minimize round trip transmission times to and from the remote computing device 115. The regulator 155 may further provide reporting capabilities used to drive logging, application events, or user interface components. According to one embodiment, the regulator 155: (a) monitors performance of the I/O pump 150; (b) performs instantaneous and historical analysis; (c) self-adjusts operational parameters to optimize performance; and (d) iteratively performs preceding operations (a) through (c) throughout the duration of a user's real-time or low latency application session.

According to one embodiment, the regulator 155 provides traffic reporting telemetry data. In alternative embodiments, a traffic reporting module provides the traffic reporting telemetry data. According to such an embodiment, monitoring I/O is performed via traffic reporting which provides the regulator 155 with detailed information about each I/O cycle.

In one embodiment, provided traffic reporting telemetry data constituting traffic reports are recorded in a journal by the regulator 155, referred to as a regulator journal 156. In one embodiment, each entry in the regulator journal 156 constitutes a regulator record, each of which may represent a single I/O cycle. The regulator journal 156 may be implemented as a ring-buffer in which old entries are reused by overwriting or updating, ect. The regulator journal 156 may store a configurable amount of data, which may be utilized for rolling or moving historical evaluations and adaptations. According to exemplary embodiments, the regulator journal 156 stores approximately 10 minutes of data.

According to such embodiments, traffic reporting telemetry data includes: regulator records updated periodically to reflect the state of each I/O cycle, the updated state for an I/O cycle being one of: (a) packing, indicating the trigger has started packing a request packet; (b) transmitting, indicating the exchanger has sent the request packet, (c) unpacking, indicating the exchanger has received a response packet; and (d) complete, indicating an entire I/O cycle is complete.

As the state of a regulator record transitions from one state to another, information may be recorded in the regulator record as follows:

While packing: (a) a total number of bytes in the request packet; (b) a total number of bytes in the request packet by media type; (c) a request packet size; (d) a response packet size; and (e) the current time (e.g., departure time for the request packet 199) according to the client clock at the local computing device 105.

Just prior to a transmission state, recording in the regulator record: (a) the number of bytes that remain queued at the local computing device 105 (e.g., a backlog); (b) estimated elapsed transmission time based on assumptions for throughput and round trip latency; (c) estimated elapsed receive time based on assumptions for throughput and round trip latency; and (d) estimated client arrival time using the time at the local computing device's client clock plus the preceding two values (estimated elapsed transmission and receive times).

During the unpacking state, recording in the regulator record: (a) the number of bytes that remain queued on the local computing device 105 (e.g., the backlog at the client); (b) an inbound packet size limit as a constraint supplied by the remote computing device 115; (c) an outbound packet size limit as a constraint supplied by the remote computing device; (d) a total number of bytes in the response packet; (e) a total number of bytes in the response packet by media type; (f) the arrival time according to the client clock (e.g., the local computing device's 105 assessment of when a response packet 198 arrives according to it's local client clock); (g) the arrival time according to the clock of the remote computing device (e.g., the remote computing device's 115 assessment or self reporting of arrival time for a request packet 199 received by the remote computing device according to the clock of the remote computing device); (h) the remote computing device's latency calculated as the remote computing device's departure time minus the remote computing device's arrival time; and (i) the current I/O depth.

In addition to this preceding information recorded according to certain embodiments, each regulator record may further maintain enumerated state variable indicating the current state of an I/O cycle.

Further recorded, according to one embodiment, are variables used to manage error conditions and retries, including: (a) corruption error count indicating a number of times the I/O Pump 150 tried but failed to unpack a response packet for a given I/O cycle; (b) transmission error count indicating the number of times the I/O cycle failed due to a TCP failure; and (c) obsolete reply count indicating the number of times the exchanger 160 should ignore the reply from the remote computing device for a given I/O cycle, in support of the retransmission/retry functionality.

According to one embodiment, I/O depth is optionally recorded in a separate I/O depth journal. When utilized, the separate I/O depth journal, in addition to maintaining the current value for I/O depth, further enables historical analysis of I/O depth to determine, for example, an average I/O depth over a period of time not to exceed an exemplary 100 seconds, the determined average then being used to refine operation of the I/O pump 150 by the regulator 150.

According to one embodiment, the regulator's 155 operation is configured according to the following session variables, including: (a) packet interval (e.g., 50 ms); (b) latency tolerance in milliseconds (ms), for example, pursuant to which latency thresholds and timeouts, etc. are based; (c) maximum inbound bandwidth in bytes per second; (d) maximum outbound bandwidth in bytes per second; and (e) minimum bandwidth in bytes per second.

According to one embodiment, the following state variables are utilized to affect the regulator's 155 approximations of traffic exchange performance: (a) nominal bandwidth, (b) nominal packet sizes, and (c) reserved packet sizes.

Regarding "(a) nominal bandwidth," the nominal inbound bandwidth in bytes per second and nominal outbound bandwidth in bytes per second reflect the regulator's 155 best guess for the amount of available bandwidth based on analysis of information previously recorded in the regulator journal 156. Such a calculation may occur immediately after each I/O cycle has competed, for instance, after each regulator record has been completed for a given I/O cycle.

Regarding "(b) nominal packet sizes," the nominal inbound packet size in bytes and nominal outbound packet size in bytes are each a function of packet interval, the number of overdue packets and nominal bandwidth, and each is updated periodically during regulator recalculation, occurring at a regulator interval not restricted or tied to the specific I/O cycles.

Regarding "(c) reserved packet sizes," the reserved inbound packet size in bytes and the reserved outbound packet size in bytes reflect an amount of bandwidth which is considered to be safely available for a relatively long period of time notwithstanding volatility of the nominal packet size, potentially changing every I/O cycle. The reserved packet size may be used for streaming video, in particular, where it is important to minimize the frequency at which the software changes encoding parameters. According to one embodiment, reserved packet size will increase at period not less than once per an exemplary eight (8) seconds, and will decrease at a period not less than an exemplary two times per second, and further in which the regulator's 155 analysis looks at the prior exemplary four (4) seconds of activity on a rolling or moving basis.

According to one embodiment, the regulator 155 operates in accordance with the following four controls: two controls affecting packet sizes for request packets 199 and response packets 198 respectively, a third control affecting packet size thresholds which is used for managing bandwidth for streaming video and other fixed-size streams, and a fourth control affecting packet interval (e.g., a configured time value for time between I/O transmission cycles).

According to one embodiment, the regulator 155 provides a bandwidth calculator to calculate nominal bandwidth and is further responsible for determining new nominal inbound and outbound bandwidth levels. According to one embodiment, the bandwidth calculator operates on an assumption that bandwidth decreases may occur at a greater rate than bandwidth increases, for instance, an assumption may be that available bandwidth is decreasing by an exemplary 10% at most per cycle and increasing by at most an exemplary 1% per cycle. According to one embodiment, the bandwidth calculator responds to decreasing bandwidth availability; responds to increasing bandwidth availability; and minimizes the number of failed attempts to increase bandwidth, for example, by detecting an increase in latency subsequent to an attempted by failed increase in bandwidth availability. Such latency changes are much more likely to be perceived by a user of real-time and low latency applications, and thus, the bandwidth calculator of the regulator operates to determine such characteristics and respond to them in a manner that will clear backlogged transmit operations and minimize latency.

According to one embodiment, two bandwidth calculators operate cooperatively on behalf of the regulator 155, a first bandwidth calculator for outbound traffic (e.g., request packets 199), and a second bandwidth calculator for inbound traffic (e.g., response packets 198).

Multiple adjustment means are utilized for adapting the bandwidth utilization exploited by the I/O pump 150, including: a slow adjustment operation, an instantaneous adjustment operation, and an I/O cycle skipping adjustment operation, each if which are described in further detail below.

According to one embodiment, bandwidth reduction is an unconditional response, such that each time an I/O cycle completes, the regulator 155 determines if actual arrival time for a packet is before or after an anticipated arrival time. If a packet is overdue, arriving later than expected, then the regulator 155 immediately reduces the nominal packet size by an exemplary 10% according to one embodiment, and optionally subjected to a threshold delay of an exemplary 2500 ms between decrease-events, so as to prevent a bandwidth crash caused by multiple packets all arriving late but close in time.

According to one embodiment, a bandwidth increase is a conditional response, such that adaptation of the I/O pump's performance is manipulated by recording the success and failure of attaining specific bandwidths in the past, according to recorded historical traffic reporting data. Thus, if the actual arrival time for a packet was later than an estimated arrival time, the regulator 155 calculates a confidence factor that is then applied to the current nominal bandwidth, resulting in a new nominal bandwidth greater than the presently effective nominal bandwidth. According to an exemplary embodiment, the regulator 155 will increase the new nominal packet size by at least an exemplary 0.1% (lowest confidence) and at most an exemplary 1% (highest confidence) per cycle.

Thus, consider an example in which the regulator 155 succeeded 95 times to increase bandwidth to 1-Mbps, and failed 5 times to increase bandwidth to the same 1-Mbps. Such a scenario may result in the confidence factor being higher when attempting to increase to the 1-Mbps given the overwhelmingly successful history, and thus, bandwidth utilization will increase fairly rapidly. Conversely, if the regulator 155 succeeded 5 times to institute an increase to 1-Mbps and failed 95 times to effect the same 1-Mbps increase, then the regulatory 155 may cause bandwidth utilization to increase slowly, with trepidation, in favor of low latency and stability, rather than risking aggressive bandwidth increases or causing thrashing and self-induced jitter characteristics.

For instance, consider the exemplary flow as set forth by FIG. 2A, depicting method 200 for adapting bandwidth utilization via the regulator's 155 adaptation of the nominal packet size, for example, by implementing a slow adjustment operation.

The methods 200, 201, and 202 describe according to the exemplary flows of FIGS. 2A, 2B, and 2C respectively may be performed by processing logic that may include hardware (e.g., circuitry, dedicated logic, programmable logic, microcode, etc.), software (e.g., instructions run on a processing device to perform various operations such transmitting, sending, receiving, monitoring, recording, updating, calculating, etc., in pursuance of the systems and methods for implementing a slipstream bandwidth management algorithm in an on-demand service environment, as described herein. Some of the blocks and/or operations listed below are optional in accordance with certain embodiments. The numbering of the blocks presented is for the sake of clarity and is not intended to prescribe an order of operations in which the various blocks must occur.

Flow of method 200 begins at block 205, in which processing logic sends request packet from local computing device to remote computing device.

At block 210, processing logic calculates anticipated arrival time for a response packet from the remote computing device corresponding to the request packet sent.

At block 215, processing logic receives the response packet corresponding to the request packet sent.

At block 220, processing logic determines (e.g., via its bandwidth calculators) if the response packet arrived on time. Based on whether on-time arrival is determined to have occurred or not, the flow branches accordingly. If yes, on-time arrival is determined, then flow proceeds to block 225, where processing logic calculates a confidence factor according to a historic bandwidth increase success ratio, or based on past bandwidth increase successes and failures. At block 230, processing logic applies a confidence multiplier to yield a new nominal packet size. And at block 235, the new nominal packet size is adopted to increase bandwidth utilization. Flow then proceeds to the end for this I/O cycle evaluation.

Alternatively, if on-time arrival is evaluated as no, then flow proceeds to block 240, where processing logic forces a reduction to nominal packet size, yielding a new nominal packet size, to reduce bandwidth, and thus causing bandwidth utilization to decrease responsive to the late arrival. Flow may optionally proceed to block 245, where processing logic resets a threshold delay, after which flow advances to the end for the given I/O cycle.

An instantaneous adjustment operation may further be utilized by the regulator. according to one embodiment, a modulated nominal packet size calculation incorporates an emergency multiplier for reducing bandwidth utilization so as to immediately and aggressively clear a backlog developing. For example, a GetEmergencyMultiplier( ) function may be used to retrieve a reduction value to be temporarily applied to packet size controls. Such a multiplier may be utilized to effect drastic and instantaneous, but temporary, changes to the packet sizes used by the I/O pump 150, such that a developing backlog may be quickly cleared without reducing an ongoing bandwidth utilization as controlled by the nominal packet size.

In such an embodiment, the regulator 155 evaluates the number of backlogged I/O cycles and responsively generates a reduction value according to configured thresholds, ranges, criteria, etc. For example, in an exemplary embodiment, the regulator 155 evaluates backlogs and generates exemplary values of 100%, 75%, 50% or 25%, etc., and then applies the reduction value to the packet size returned by the bandwidth calculator, yielding a modulated nominal packet size representing the packet size that is actually used when packing request packets. With the reduction value applied yielding a modulated nominal packet size, the regulator monitors for the backlog to decrease sufficiently according to a threshold (e.g., no backlog, or some other acceptable value), after which the temporarily instituted modulated nominal packet size is withdrawn, thus causing the I/O pump to revert to its nominal packet size.

Consider the exemplary flow as set forth by FIG. 2B, depicting another method 201 for adapting bandwidth utilization via the regulator's 155 adaptation of bandwidth communicated for the application, for example, by implementing an instantaneous adjustment operation.

According to the flow, processing logic begins at block 250 for evaluating the current backlog. A determination is made whether the backlog exceeds a threshold. If "no," then flow returns to block 250 and iteratively cycles as needed such that an instantaneous adjustment operation according to the flow 201 may be initiated when and if the backlog does exceed the threshold.

Conversely, if "yes," the backlog as evaluated does exceed the threshold, then flow advances to block 255 where processing logic gets a reduction value based on the extent of the backlog at present, that is, at the time of the evaluation of the backlog.

Flow then advances to block 260 where processing logic applies the reduction value to generate a modulated nominal packet size to temporarily reduce bandwidth utilization.

At block 265, processing logic adopts the modulated nominal packet size until backlog reduced below acceptable threshold, which is controlled by the next decision point in which it is determined whether the backlog is below an acceptable threshold. If "no," then flow returns again to block 265 until the backlog is reduced below an acceptable threshold. Alternatively, if "yes," the backlog is reduced below the acceptable threshold, then flow advances to block 270 where processing logic reverts to the nominal packet size, thus returning to the previous bandwidth utilization level prior to instituting the instantaneous adjustment operation. Flow then either ends or iterates as necessary by returning to block 250 where processing logic again evaluates the current backlog.

According to another embodiment, means for implementing an I/O cycle skipping adjustment operation is employed. According to one embodiment, the regulator 155 calculates the amount of time, via the number of exemplary 50 ms cycles, required to trigger the next I/O cycle, according to configured operational parameters. During ordinary operation (e.g., backlogs and latency metrics are within acceptable parameters), the value is "1," and thus, a new cycle is triggered according to the configured cycle time. Thus, if the exemplary cycle time was 100 ms, and the number of cycles required is "1" then every 100 ms, a new I/O cycle would be triggered, and so forth, according to the configured cycle time.

According to one embodiment, processing logic of the regulator 155 evaluates for an excessive backlog, as determined according to another threshold, and upon the occurrence of such an event, the regulator 155 will start skipping entire I/O cycles in an effort to clear any potential packet "log jam" of data, by applying a greater number of cycles required before the next I/O cycle is triggered. Thus, for an exemplary 50 ms cycle time, if the regulator changes the value of cycles required to "3," then 150 ms would have to pass (e.g., 3× individual 50 ms cycles) before the next I/O cycle is triggered, thus effectively slashing the I/O Pump's operational capacity by ⅓, in such an example. The value of cycles required may be manipulated according to a scale or other appropriate criteria.

Evaluation of the backlog continues, during which time the value of cycles required may continue to be manipulated. As the evaluation of the backlog continues, when it is determined that the backlog is reduced below and acceptable threshold, then the value of cycles required may be reverted to "1" indicating normal operational parameters, and thus allowing the I/O pump to return to its normal periodicity and thus, bandwidth capacity in place before the I/O cycle skipping adjustment operation began.

Consider the exemplary flow as set forth by FIG. 2C, depicting another method 202 for adapting bandwidth utilization via the regulator's 155 adaptation of the nominal packet size, for example, by implementing an I/O cycle skipping adjustment operation.

According to the flow, processing logic begins at block 275 for evaluating the current backlog according to an excessive backlog threshold. A determination is made whether the backlog exceeds an excessive backlog threshold. If "no," then flow returns to block 275 and iteratively cycles as needed such that an I/O cycle skipping adjustment operation according to the flow 202 may be initiated when and if the backlog does exceed the excessive backlog threshold.

Conversely, if "yes," the backlog as evaluated does exceed the excessive backlog threshold, then flow advances to block 280 where processing logic increases the value of cycles required before next I/O cycle to reduce backlog by skipping I/O cycles.

Flow then advances to block 285 where processing logic continues to trigger I/O cycles according to the increased value of cycles required. Thus, if a configured exemplary 50 ms cycle time is being utilized and the value is increased to, for example, "5," then the increased value of cycles required operates as a multiplier against the configured cycle time, causing 250 ms to pass in between the triggering of each successive I/O cycle, effectively "skipping" I/O cycles according to the configured 50 ms cycle time utilized under normal operational parameters (e.g., backlog and latency, etc., within acceptable levels).

Flow is then controlled by the next decision point in which it is determined whether the backlog is below an acceptable threshold. If "no," then flow returns again to block 285 until the backlog is reduced below an acceptable threshold. Alternatively, if "yes," the backlog is reduced below the acceptable threshold, then flow advances to block 290 where processing logic resets the cycles required value to "1" thus returning operation to normal parameters, for example, adhering to the configured cycle time. Flow then either ends or iterates as necessary by returning to block 275 where processing logic again evaluates the current backlog according to an excessive backlog threshold.

According to one embodiment, a reserved bandwidth calculation is conducted by the regulator 155. According to such an embodiment, the final packet size control determines reserved bandwidth. According to one embodiment, the regulator 155 calculates an exemplary 90% of the minimum packet size used over the last exemplary four (4) seconds on a moving basis. In one embodiment, adjustments and updates are subjected to delay periods so as to minimize the number of changes to reserved bandwidth in accordance with an acceptable level.

According to the disclosed embodiments, retransmission may occur for failed I/O cycles and may alternatively or additionally occur for delayed I/O cycles. Since certain types of media require lossless transmission, else their decoder may crash or stall unacceptably, the I/O Pump 150 must guarantee that all packets are successfully transmitted both to and from the remote computing device (such as a media server) in a timely manner, so as to adhere to a lossless requirement. Other media are more resilient, and while packet loss may cause temporarily reduction in fidelity, blocking, noise, jumping, or other quality degrading effects, the loss of some packets is not fatal and may be accepted so as to ensure, for example, a lower latency.

There are two types of retransmission applied by the regulator through the I/O pump: retransmission for failed I/O cycles and retransmission for delayed I/O cycles, each supplanting retransmission operations embodied by a conventional TCP/IP protocol stack.

Regarding retransmission for failed I/O cycles, it is envisioned that every I/O cycle may fail in at least one of the two following ways: (1) Failure in transmission, in which the I/O cycle fails to transmit a request packet from the local computing device to the remote computing device (e.g., from a client to a server, or from a first peer to a remote peer); or (2) a failure in the reception, in which the I/O cycle of the local computing device successfully transmits the request packet from the local to the remote computing device, but in which the remote computing device fails to transmit the response packet back to the local computing device.

Where a local computing device detects a failed I/O cycle, it assumes that the network failed to deliver the request packet and will automatically retry. Because request packets are automatically buffered on the local computing device's stack, retrying is a simple operation, and if indeed the I/O failure is due to a transmission failure, the re-try from the local computing device will directly correct the issue. Conversely, if the failure is a reception failure at the remote computing device, then according to one embodiment, the remote computing device is configured to ignore the contents of the request packet and simply return a copy of the response packet for the retried request. Such functionality may be facilitated by optional implementation of a cooperative user packet store on the remote computing device. A capable remote computing device must therefore implement the user packet store according to such an embodiment for this aspect of retry functionality specifically for address reception failures. Otherwise, a reception failure will simply cause a retry from the local computing device in which the remote device may eventually respond to both requests, one of which may be ignored at the local device, or in which the remote device implements its own non-cooperative functionality to ignore redundant request packets.

When utilized at a remote computing device, a user packet store records or stores a history of all request packets already received, and further, maintains a copy of all response packets, maintaining at least a recent sub-set of such response packets such that one may be re-sent in the event of a reception failure when returning a response packet from the remote computing device to the local computing device. In an alternative embodiment, response packets are stored via the user packet store at a remote computing device until an acknowledgement is received. Such acknowledgements are provided in the request packets via an 'exchange header' which provides this overhead logistics information to be exchanged between the local and remote computing devices.

According to one embodiment, the exchange header for request packets has a different format than the exchange header for response packets. In such an embodiment, the exchange header for request packets has a recently unique identifier called 'request index' which is used to identify both request packets as well as response packets. In one embodiment, a local computing device acknowledges receipt of response packets from the remote computing device by including the indices of these packets in the exchange header for a request packet. Such an exchange header for a request packet may contain 0, 1, 2, etc., such acknowledgements, depending on the number of acknowledgements on hand. When the acknowledgements are received by the remote computing device, they are processed to remove previously sent response packets from the user packet store. In such a way, the acknowledgement mechanism of the TCP/IP stack is also optionally supplanted by the functionality instituted by the I/O pump.

According to the described embodiments, retransmission for delayed I/O cycles may also be implemented supplanting retransmission functionality utilized by the TCP/IP protocol stack. According to one embodiment, any given I/O cycle may be delayed in at least two different ways: (1) failure in transmission, in which the I/O cycle failed to transmit a request packet from the local computing device to the remote computing device within a reasonable amount of time according to configured thresholds; and (2) failure in reception, in which the I/O cycle successfully and promptly transmitted the request packet, but in which the remote computing device fails to responsively transmit back the corresponding response packet to the local computing device in a reasonable amount of time according to configured thresholds (e.g., timeouts, etc.).

When a delayed I/O cycle condition is determined by the regulator evaluating for anticipated and acceptable response times, the trigger 170 will be caused to generate a duplicate of the original exchange task 163, in turn causing a duplicated request packet 199 to be sent it in place of normal outbound traffic, for example, out of turn in certain embodiments, in which the duplicated task is prioritized greater than existing tasks or prioritized above all other tasks, etc. If the delayed I/O cycle condition was the result of a failure in transmission from the local computing device to the remote computing device, then the duplicated request packet 199 may or may not be received before the original request packet is received by the remote computing device.

Whichever among the original request packet 199 or the duplicated request packet 199 is the first to arrive will be processed first, causing the remote computing device to responsively produce a response packet, with the later arriving packet triggering the return of a duplicate of the response packet from the remote computing device which will be ignored by the local computing device, assuming it is received last at the local computing device, else the initial packet, now redundant, will be ignored as the late and duplicate response packet arrival.

According to one embodiment, a clock synchronization module, or a clock synchronization function of the regulator provides sufficient alignment between the local computing device and the remote computing device to carry out the above described calculations and methodologies. Synchronization need not be precise, however, and likely will exhibit systemic yet consistent error. Where clock synchronization lacks precision, yet provides a fairly constant degree of error, an offset or correction may be applied so as to carryout the necessary calculations. For example, arrival time for a remote computing device will always be evaluated as greater than a transmit time from a local computing device, and will adjusted if necessary such that such an evaluation is forced to be true. Then the consistent and systemic error, if any, will be exploited for the remainder of a session on the assumption that a remote computing device's clock is not varying wildly over time, but rater, is advancing at a predictable rate, regardless of its reported absolute value. For instance, where a reported time from the remote computing device is determined to be off by an exemplary 30 ms in either direction, then it is assumed that such an error will be maintained for the duration of a session, thus rendering a degree of error wholly inconsequential.

The regulator 155 may conduct evaluation with on the basis of varying latency, and not variations in reported time of a remote computing device. Should a clock of a remote computing device be determined as varying on an ongoing basis (e.g., due to clock "drift"), then the clock synchronization may be iteratively performed throughout a session to update an applied offset correction.

According to one embodiment, clock synchronization calculates a bias based on feasibility tests and adds the bias to the client's clock, that is, the bias is added to the time reported by the local computing device operating in the role of a client or peer. According to one embodiment, the feasibility tests produce a minimum feasible bias, and a maximum feasible bias. If the current bias is less than the minimum feasible bias, it is set as the minimum feasible bias. Conversely, if the current bias is greater than the maximum feasible bias, it is set as the maximum feasible bias. Based on the direction of the clock drift between the local computing device and the remote computing device, clock synchronizer will tend to use only one of these adjustments by either periodically increasing the bias, or periodically decreasing the bias. The degree of error will be reflected in the minimal latencies seen in the to and from (e.g., outgoing and incoming) exchanges with a remote computing device. In one such embodiment, outbound latency will always appear to be near zero and inbound latency will always be close to a total round-trip latency, while in other embodiments, outbound latency will always appear to be close to round-trip latency and inbound latency will always appear to be close to zero, thus resulting in a degree of error which is generally expected to be fairly constant for a user's entire session.

According to certain embodiments, potential bandwidth is never explicitly measured by the regulator 155, rather, it is presumed that nominal bandwidths are less than or equal to potential throughput of the transport network, such as the potential throughput of the public Internet given the origination and termination points, the paths established, and the pertinent operational characteristics of the public Internet at the time of transmission, many of such operational characteristics being wholly outside the scope of control enjoyed by the application 180A, the I/O pump, or the local computing device generally. Accordingly, the regulator may not be aware of potential throughput in excess of the throughput actually attempted during a session. Thus, it may be unknowable by the regulator whether 1-Mbps of potential throughput exists, if the regulator never attempts transmissions at, for example, a rate of more than an exemplary 200 Kbps. The regulator may, however, benefit from knowledge of whether or not higher potential bandwidth levels are available, regardless of whether or not they have been affirmatively attempted.

According to one embodiment, the regulator initiates transmission of 'garbage data,' or data which is not requested or required by the application 180A. Such garbage data may be utilized to scout out or investigate whether higher bandwidth levels exist. Such garbage data may be random and low-priority data that is used as filler when a maximum packet size is less than a current capacity of the packet according to nominal packet size controlling or affecting request and response packet sizes. Such garbage data may be limited in various ways to reduce negative impacts to the network and user experience, such as limiting transmit times, transmit amounts, and the recurring rate for transmitting such garbage data.

According to one embodiment, bandwidth measurements are determined based on the number of bits transmitted over a particular timeframe, divided by the timeframe. Where discrete I/O cycles are measured over small timeframes, the results may exhibit high variability, whereas measurements over longer timeframes will be smoother over time and thus exhibit less variability. For this reason, bandwidth measurements may be reported with a timeframe over which the measurement occurred in certain embodiments, which provides a measure of confidence or appropriateness of the reported bandwidth measurement.

FIG. 3A depicts an alternative exemplary architectural overview 300 of the environment in which embodiments may operate. In particular, there are depicted multiple customer organizations 305A, 305B, and 305C. Obviously, there may be many more customer organizations than those depicted. In the depicted embodiment, each of the customer organizations 305A-C includes at least one client device 306A, 306B, and 306C. A user may be associated with such a client device, and may further initiate requests to the host organization 310 which is connected with the various customer organizations 305A-C and client devices 306A-C via network 325 (e.g., such as via the public Internet).

According to one embodiment, the client devices 306A-C each include an I/O pump and regulator 307 in support of the various methodologies described herein. The client devices 306A-C each individually transmit request packets 316 to the remote host organization 310 via the network 325. The host organization 310 may responsively send response packets 315 to the originating customer organization to be received via the respective client devices 306A-C and their supporting I/O pump and regulators 307.

Within host organization 310 is a request interface 375 which receives the packet requests 315 and other requests from the client devices 306A-C and facilitates the return of response packets 316. Further depicted is a query interface 380 which operates to query database 350 in fulfillment of such request packets from the client devices 306A-C. Server side application 385 may operate cooperatively with a real-time or low latency application at the various client devices 306A-C.

Figure 4:
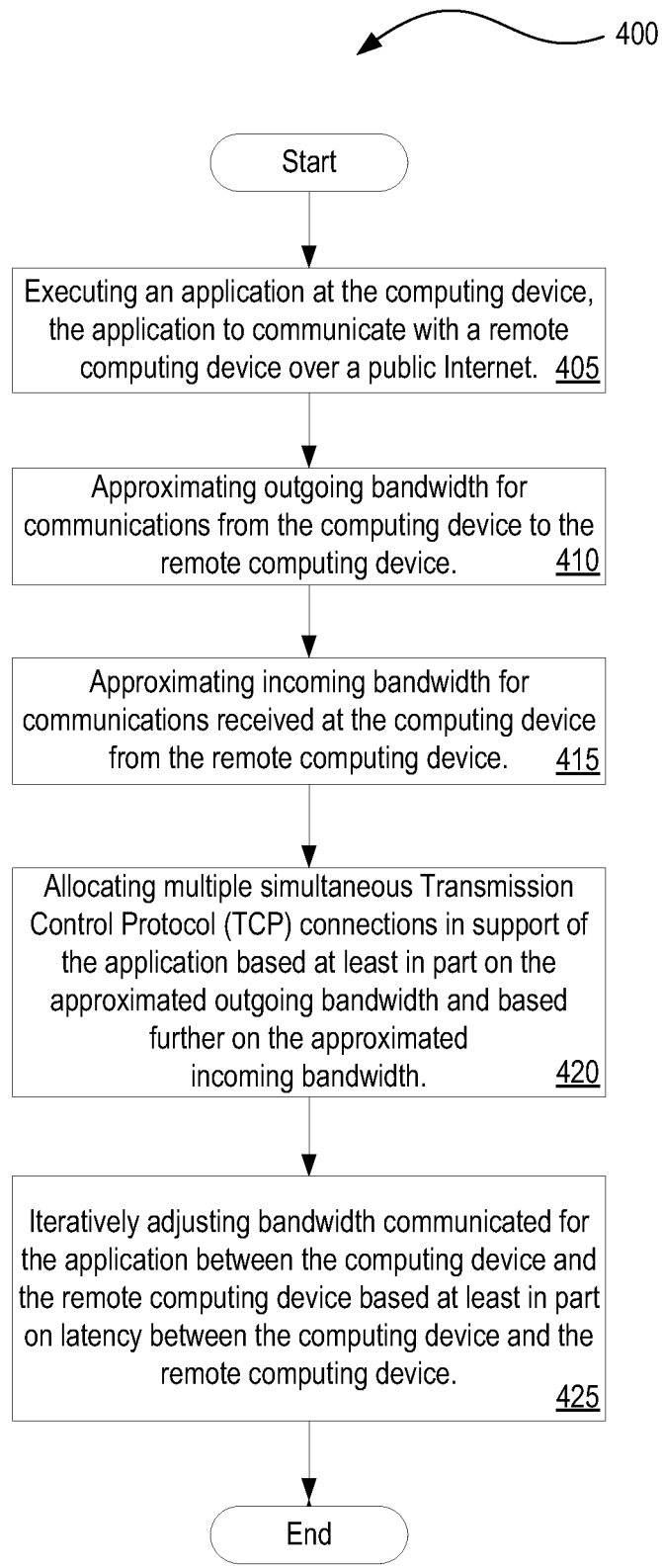
FIG. 4 is a flow diagram illustrating another method in accordance with disclosed embodiments.

FIG. 4 is a flow diagram illustrating another method 400 in accordance with disclosed embodiments. Method 400 may be performed by processing logic that may include hardware (e.g., circuitry, dedicated logic, programmable logic, microcode, etc.), software (e.g., instructions run on a processing device to perform various operations such transmitting, sending, receiving, monitoring, recording, updating, calculating, etc., in pursuance of the systems, apparatuses, and methods for implementing a slipstream bandwidth management algorithm, as described herein. For example, local computing device 105 of FIG. 1 may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic executes an application at a computing device, in which the application is to communicate with a remote computing device over a public Internet.

At block 410, processing logic approximates outgoing bandwidth for communications from the computing device to the remote computing device.

At block 415, processing logic approximates incoming bandwidth for communications received at the computing device from the remote computing device.

block 420, processing logic allocates multiple simultaneous Transmission Control Protocol (TCP) connections in support of the application based at least in part on the approximated outgoing bandwidth and based further on the approximated incoming bandwidth.

block 425, processing logic iteratively adjusts bandwidth communicated for the application between the computing device and the remote computing device based at least in part on latency between the computing device and the remote computing device.

According to another embodiment of the method 400, the application includes one or more of the following application types: a real-time communications application; a low latency communications application; a Voice over Internet Protocol (VoIP) application; an audio streaming application; a video streaming application; a bi-directional audio streaming application; a video streaming application; a screen sharing application; and a web-cam audio/video application.

According to another embodiment of the method 400, iteratively adjusting bandwidth communicated for the application includes: iteratively adjusting a nominal packet size for data packets communicated in support of the application between the computing device and the remote computing device based at least in part on latency between the computing device and the remote computing device.

According to another embodiment of the method 400, iteratively adjusting bandwidth communicated for the application includes applying one or more of the following adjustments to the bandwidth communicated for the application: (i) applying a slow adjustment operation; (ii) applying an instantaneous adjustment operation; and (iii) applying an Input/Output (I/O) cycle skipping adjustment operation.

According to another embodiment of the method 400, iteratively adjusting bandwidth communicated for the application includes applying a slow adjustment having the following operations: sending a request packet from the computing device to a remote computing device; calculating anticipated arrival time for a response packet from the remote computing device corresponding to the request packet sent; receiving the response packet corresponding to the request packet sent; determining whether the response packet arrived on time; and applying an adjustment to bandwidth communicated for the application based on whether the response packet arrived on time.

According to another embodiment of the method 400, applying an adjustment to the bandwidth communicated for the application based on whether the response packet arrived on time includes: modifying a nominal packet size affecting the bandwidth communicated for the application; in which outgoing bandwidth for the application constitutes sending request packets from the computing device to the remote computing device, the request packets having a request packet size based on the nominal packet size; and in which incoming bandwidth for the application constitutes receiving response packets from the remote computing device responsive to request packets sent from the computing device, the response packets having a response packet size based on the nominal packet size.

According to another embodiment of the method 400, applying an adjustment to bandwidth communicated for the application based on whether the response packet arrived on time, includes: forcing a reduction to the bandwidth communicated for the application when the response packet is determined to have arrived after the anticipated arrival time.

According to another embodiment of the method 400, forcing the reduction to the bandwidth communicated for the application further includes resetting a threshold delay for a next a reduction to the bandwidth communicated for the application, in which the threshold delay prohibits further reduction to the bandwidth communicated until the threshold delay elapses.

According to another embodiment of the method 400, applying an adjustment to bandwidth communicated for the application based on whether the response packet arrived on time, includes: increasing the bandwidth communicated for the application when the response packet is determined to have arrived on time according to the anticipated arrival time.

According to another embodiment of the method 400, increasing the bandwidth communicated for the application when the response packet is determined to have arrived on time according to the anticipated arrival time, includes: calculating a confidence factor according to historic bandwidth increase successes; and applying the confidence factor as a multiplier for increasing the bandwidth communicated for the application by at least a portion.

According to another embodiment of the method 400, the confidence factor is affected by at least one of the following: (i) in which the confidence factor increases based on a ratio of the historic bandwidth increase successes to historic bandwidth increase failures exceeding a threshold; (ii) in which the confidence factor decreases based on a ratio of the historic bandwidth increase failures exceeding historic bandwidth increase increases; (iii) in which the confidence factor increases based on the bandwidth communicated for the application being in effect for the application for an aggregate time period above a threshold time; (iv) in which the confidence factor decreases based on the bandwidth communicated for the application yet to have been successful at a rate above a present rate; (v) in which the confidence factor increases based on a total quantity of historic bandwidth increase successes; and (vi) in which the confidence factor decreases based on a total quantity of historic bandwidth increase failures.

According to another embodiment of the method 400, applying the confidence factor as a multiplier for increasing the bandwidth communicated for the application by at least a portion, includes: applying the confidence factor as a multiplier to a nominal packet size affecting the bandwidth communicated for the application yielding a new nominal packet size; and adopting the new nominal packet size causing the bandwidth communicated for the application to increase by at least a portion.

According to another embodiment of the method 400, iteratively adjusting bandwidth communicated for the application includes applying an instantaneous adjustment having the following operations: evaluating a backlog of request packets awaiting transmission from the computing device to the remote computing device; determining whether the backlog of request packets exceeds a threshold; applying a temporary reduction to packet sizes constituting the bandwidth communicated for the application until the backlog is determined to fall below a threshold; and removing the temporary reduction.

According to another embodiment of the method 400, applying the temporary reduction to packet sizes constituting the bandwidth communicated for the application includes: retrieving a reduction value based on an extent the backlog is evaluated to exceed the threshold; applying the reduction value to a nominal packet size to generate a modulated nominal packet size; and adopting the modulated nominal packet size to effect an instantaneous reduction in the bandwidth communicated for the application.

According to another embodiment of the method 400, applying the reduction value to the nominal packet size to generate the modulated nominal packet size includes: temporarily adopting the modulated nominal packet size in place of the nominal packet size, the modulated nominal packet size affecting the bandwidth communicated for the application for the duration of its temporary adoption; in which outgoing bandwidth for the application constitutes sending request packets from the computing device to the remote computing device, the request packets having a request packet size based on the modulated nominal packet size; and in which incoming bandwidth for the application constitutes receiving response packets from the remote computing device responsive to request packets sent from the computing device, the response packets having a response packet size based on the modulated nominal packet size.

According to another embodiment of the method 400, retrieving the reduction value based on an extent the backlog is evaluated to exceed the threshold includes one of: (i) retrieving reduction values of 25%, 50%, 75%, or 100% based on whether the backlog exceeds one of a plurality of tiered thresholds, each corresponding to one of the reduction values; (ii) retrieving reduction values of 25%, 50%, 75%, or 100% based on a quantity of request packets awaiting transmission from the computing device to the remote computing device presently queued; or (iii) retrieving reduction values of 25%, 50%, 75%, or 100% based on a ratio of queued request packets awaiting transmission to a quantity of previously transmitted request packets over a fixed period of time preceding the evaluation; and in which the method further includes: multiplying the reduction value retrieved against the nominal packet size to yield the modulated nominal packet size.

According to another embodiment of the method 400, removing the temporary reduction includes: iteratively evaluating whether the backlog remains above the threshold; and reverting to the nominal packet size in effect before the instantaneous adjustment when the backlog is determined to have fallen below the threshold.

According to another embodiment of the method 400, iteratively adjusting bandwidth communicated for the application includes applying an Input/Output (I/O) cycle skipping adjustment having the following operations: evaluating a backlog of request packets awaiting transmission from the computing device to the remote computing device; determining whether the backlog of request packets exceeds a threshold; and skipping Input/Output (I/O) transmissions cycles of request packets from the computing device to the remote computing device effecting a reduction in the bandwidth communicated for the application until the backlog is determined to fall below a threshold.

According to another embodiment of the method 400, skipping the I/O transmissions cycles of request packets from the computing device to the remote computing device includes: retrieving a configured value for time between I/O transmission cycles; modifying a quantity of cycles required between I/O cycles from a default of "1" to an integer greater than "1;" multiplying the modified quantity of cycles required between I/O cycles by the configured time value for time between I/O transmission cycles to yield an I/O transmission cycle skipping time; and triggering new I/O cycles for transmitting request packets from the computing device to the remote computing device according to the I/O transmission cycle skipping time, in which the I/O transmission cycle skipping time is an integer multiple of the configured value for time between I/O transmission cycles.

According to another embodiment of the method 400, the method further includes: iteratively evaluating whether the backlog remains above the threshold; and reverting from an I/O transmission cycle skipping time effecting the skipping of the I/O transmissions cycles of request packets to the configured value for time between I/O transmission cycles when the backlog is determined to have fallen below the threshold.

According to another embodiment of the method 400, allocating multiple simultaneous Transmission Control Protocol (TCP) connections in support of the application includes: creating a plurality of TCP connections in a connection pool, the plurality of TCP connections dedicated exclusively to supporting the bandwidth communicated for the application and available to no other application executing at the computing device.

According to another embodiment of the method 400, allocating multiple simultaneous Transmission Control Protocol (TCP) connections in support of the application includes each of the multiple simultaneous TCP connections having one of the following enumerated states: a closed state indicating the TCP connection to the remote computing device is currently closed; a busy state indicating the TCP connection to the remote computing device is open, but is currently in use and awaiting a reply from the remote computing device; and an available state indicating the TCP connection to the remote computing device is open, is not in use, and is immediately available for use.

According to another embodiment of the method 400, the method 400 further includes: opening one or more of the simultaneous TCP connections when there are TCP connections in the closed state; and dynamically allocating additional simultaneous TCP connections in support of the application when all of the multiple simultaneous TCP connections are in the busy state, and when none of the multiple simultaneous TCP connections are in the available state, and when none of the multiple simultaneous TCP connections are in the closed state.

According to another embodiment of the method 400, the method 400 further includes: pre-allocating a minimum plurality of multiple simultaneous TCP connections in support of the application at an initiation phase according to a minimum simultaneous TCP connection threshold; and in which dynamically allocating additional simultaneous TCP connections in support of the application is restricted by a maximum simultaneous TCP connection threshold.

According to one embodiment, there is a non-transitory computer readable storage medium having instructions stored thereon that, when executed by a processor in a computing device, the instructions cause the computing device to perform operations comprising: executing an application at the computing device, the application to communicate with a remote computing device over a public Internet; approximating outgoing bandwidth for communications from the computing device to the remote computing device; approximating incoming bandwidth for communications received at the computing device from the remote computing device; allocating multiple simultaneous Transmission Control Protocol (TCP) connections in support of the application based at least in part on the approximated outgoing bandwidth and based further on the approximated incoming bandwidth; and iteratively adjusting a nominal packet size for data packets communicated in support of the application between the computing device and the remote computing device based at least in part on latency between the computing device and the remote computing device.

In another embodiment of the non-transitory computer readable storage medium, iteratively adjusting bandwidth communicated for the application includes applying one or more of the following adjustments to the bandwidth communicated for the application: (i) applying a slow adjustment operation; (ii) applying an instantaneous adjustment operation; and (iii) applying an Input/Output (I/O) cycle skipping adjustment operation.

In another embodiment of the non-transitory computer readable storage medium, iteratively adjusting bandwidth communicated for the application includes iteratively adjusting a nominal packet size for data packets communicated in support of the application between the computing device and the remote computing device based at least in part on latency between the computing device and the remote computing device; in which outgoing bandwidth for the application constitutes sending request packets from the computing device to the remote computing device, the request packets having a request packet size based on the nominal packet size; and further in which incoming bandwidth for the application constitutes receiving response packets from the remote computing device responsive to request packets sent from the computing device, the response packets having a response packet size based on the nominal packet size.

Figure 5:
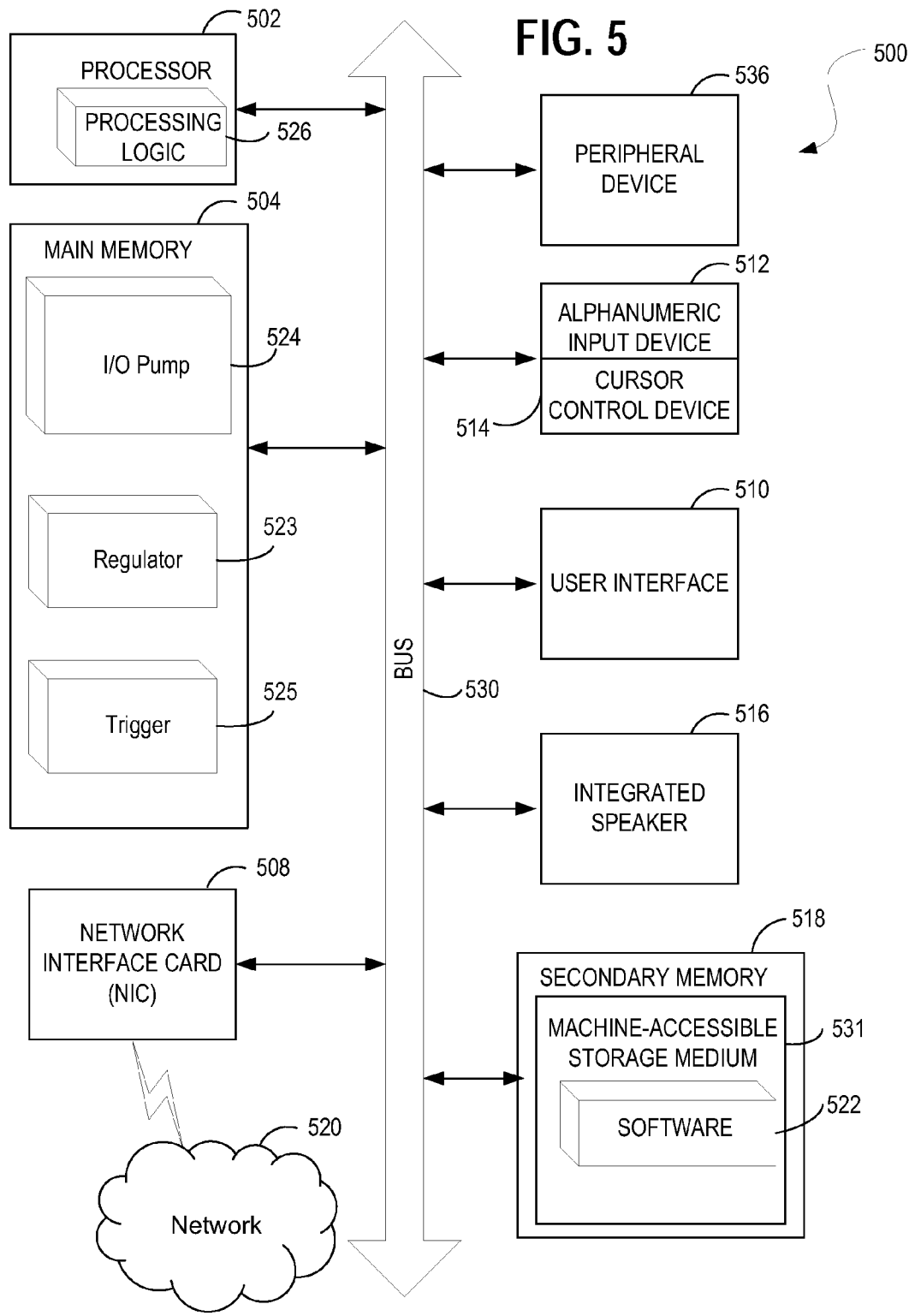
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes an I/O pump 524, a trigger 525, and a regulator 523. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6:
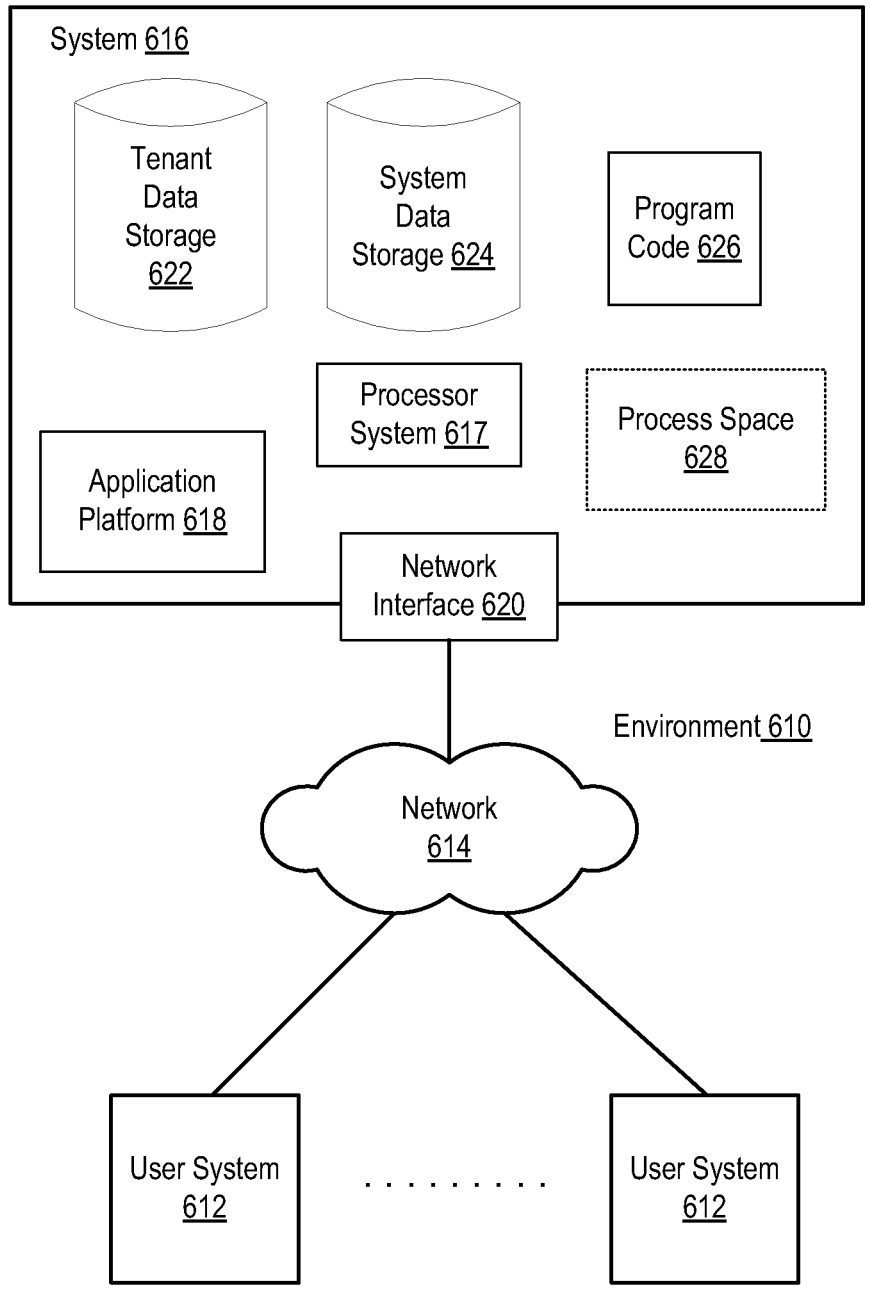
FIG. 6 illustrates a block diagram of an example of an environment in which an on-demand database service might be used.

FIG. 6 illustrates a block diagram of an example of an environment 610 in which an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
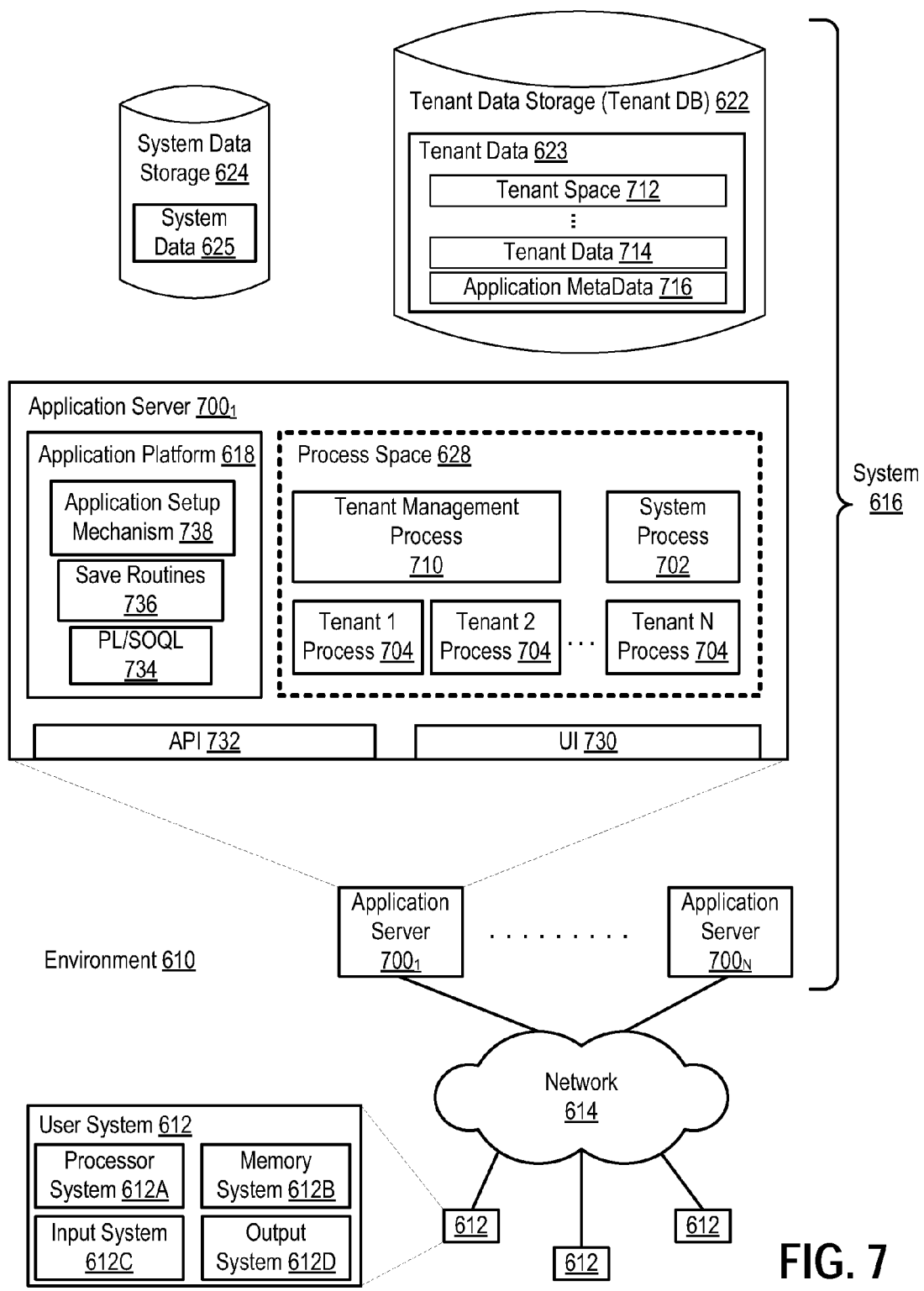
FIG. 7 illustrates a block diagram of an embodiment of elements of FIG. 6 and various possible interconnections between these elements.

FIG. 7 illustrates a block diagram of an embodiment of elements of FIG. 6 and various possible interconnections between these elements. FIG. 7 also illustrates environment 610. However, in FIG. 7, the elements of system 616 and various interconnections in an embodiment are further illustrated. FIG. 7 shows that user system 612 may include a processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method at a computing device having at least a processor and a memory therein, the method comprising:
    executing an application via the processor at the computing device;
    executing an Input/Output pump streaming platform ("TO Pump") via the processor at the computing device, the IO Pump executing separately and distinctly from the application;
    approximating bandwidth for the application;
    allocating, via the IO Pump, multiple simultaneous Transmission Control Protocol (TCP) connections in support of the application based at least in part on the bandwidth approximation for the application; and
    transmitting data from the computing device to a remote computing device on behalf of the application using multiple of the allocated TCP connections simultaneously by sending data on at least a first of the multiple of the allocated TCP connections while receiving data on at least a second of the multiple of the allocated TCP connections.

2. The method of claim 1, wherein transmitting data from the computing device to a remote computing device on behalf of the application using multiple of the allocated TCP connections simultaneously further comprises waiting for at least a third of the multiple of the allocated TCP connections having been blocked pending a response packet from the remote computing device.

3. The method of claim 1:
    wherein the remote computing device comprises a server communicatively interfaced the computing device via a network; and
    wherein each of the multiple simultaneous Transmission Control Protocol (TCP) connections constitute a single half-duplex TCP/IP capable connection enabled to, at any time, be transmitting data to the server via the network, or receiving data from the server via the network, or transmitting and receiving nothing, but cannot simultaneously be transmitting and receiving in both directions via any single half-duplex TCP/IP capable connection.

4. The method of claim 1, wherein approximating bandwidth for the application comprises approximating bandwidth for the application in each of the outbound and inbound directions individually.

5. The method of claim 4, wherein approximating bandwidth for the application in each of the outbound and inbound directions individually comprises:
    determining outbound potential bandwidth capacity;
    determining inbound potential bandwidth capacity; and
    wherein the determined outbound potential bandwidth capacity and the determined inbound potential bandwidth capacity differ.

6. The method of claim 1, further comprising:
    optimizing the transmitting in each of an outbound direction and an inbound direction based on a determined outbound potential bandwidth capacity and a determined inbound potential bandwidth capacity for the outbound and the inbound directions respectively.

7. The method of claim 6, wherein optimizing the transmitting in each of an outbound direction and an inbound direction comprises one of:
    optimizing the transmitting in support of improved quality for audio applications, wherein the application comprises an audio streaming application communicating with the remote computing device over a network;
    optimizing the transmitting in support of improved quality for video applications, wherein the application comprises a video streaming application communicating with the remote computing device over the network;
    optimizing the transmitting in support of improved quality for Voice over Internet Protocol (VoIP) applications, wherein the application comprises a VoIP application communicating with the remote computing device over the network;
    optimizing the transmitting in support of improved quality for bi-directional audio streaming applications, wherein the application comprises a bi-directional audio streaming application communicating with the remote computing device over the network;
    optimizing the transmitting in support of improved quality for screen sharing applications, wherein the application comprises a screen sharing application communicating with the remote computing device over the network; and
    optimizing the transmitting in support of improved quality for web-cam audio/video applications, wherein the application comprises a web-cam audio/video application communicating with the remote computing device over the network.

8. The method of claim 6, wherein optimizing the transmitting in each of an outbound direction and an inbound direction comprises at least one of:
    optimizing for the sake of reduced latency;
    optimizing for the sake of preventing underutilization of available bandwidth; and
    optimizing for the sake of preventing over-utilization of available bandwidth amongst nodes, hops, and network devices between the local computing device and the remote computing device along the transmitting path to avoid the nodes, hops, and network devices from buffering data and exacerbating latency problems.

9. The method of claim 6, wherein optimizing the transmitting in each of an outbound direction and an inbound direction comprises:
maximization bandwidth utilization while minimizing an amount of latency and further minimizing effects of packet loss and jitter.

10. The method of claim 1, wherein transmitting data from the computing device to a remote computing device on behalf of the application using multiple of the allocated TCP connections simultaneously further comprises opening and maintaining the multiple simultaneous TCP/IP connections originating at the computing device and terminating at the remote computing device on behalf the application as a single executing at the computing device.

11. The method of claim 1, further comprising implementing an I/O Cycle process for:
(i) creating a request packet from the application's data for transmission to the remote computing device;
(ii) transmitting the request packet crated from the application's data to the remote computing device;
(iii) receiving a response packet from the remote computing device; and
(iv) sending returned data received via the response packet back to the application.

12. The method of claim 11, further comprising:
reporting traffic telemetry data via a traffic report having therein detailed information corresponding to each I/O cycle of the I/O Cycle process, the traffic report providing at least an updated state of each I/O cycle, the updated state for an I/O cycle being one of:
(a) packing, indicating a trigger has started packing a request packet;
(b) transmitting, indicating an exchanger has sent the request packet;
(c) unpacking, indicating the exchanger has received a response packet; and
(d) complete, indicating the respective I/O cycle is complete.

13. The method of claim 1, wherein allocating the multiple simultaneous Transmission Control Protocol (TCP) connections in support of the application comprises:
maintaining a connection pool having the multiple simultaneous Transmission Control Protocol (TCP) connections therein according to an I/O depth representing a number of connections in the connection pool that are currently active and further maintaining state information for all connections within the connection pool.

14. The method of claim 1, wherein each one of the multiple simultaneous Transmission Control Protocol connections allocated in support of the application comprises one of the following enumerated states:
a closed state indicating the TCP connection to the remote computing device is currently closed;
a busy state indicating the TCP connection to the remote computing device is open, but is currently in use and awaiting a reply from the remote computing device; and
an available state indicating the TCP connection to the remote computing device is open, is not in use, and is immediately available for use.

15. The method of claim 1, further comprising:
opening one or more of the multiple simultaneous TCP connections when there are TCP connections in a closed state available within a connection pool having the multiple simultaneous TCP connections therein; and allocating additional simultaneous TCP connections into the connection pool in support of the application when each of three criteria are present, the three criteria comprising:
(1) all of the multiple simultaneous TCP connections in the connection pool are in a busy state,
(2) none of the multiple simultaneous TCP connections in the connection pool are in an available state, and
(3) none of the multiple simultaneous TCP connections in the connection pool are in the closed state.

16. The method of claim 1, further comprising:
pre-allocating a minimum plurality of multiple simultaneous TCP connections into a connection pool in support of the application at an initiation phase according to a minimum simultaneous TCP connection threshold; and
restricting allocating additional simultaneous TCP connections in support of the application according to a maximum simultaneous TCP connection threshold for all simultaneous TCP connections in the connection pool without regard to state of any of the multiple simultaneous TCP connections in the connection pool.

17. The method of claim 1, further comprising:
iteratively adjusting bandwidth used for transmitting data on behalf of the application by applying one or more of the following adjustments:
(i) applying a slow adjustment operation;
(ii) applying an instantaneous adjustment operation; and
(iii) applying an Input/Output (I/O) cycle skipping adjustment operation.

18. Non-transitory computer readable storage media having instructions stored thereon that, when executed by a processor in a computing device, the instructions cause the computing device to perform operations comprising:
executing an application via the processor at the computing device;
executing an Input/Output pump streaming platform ("IO Pump") via the processor at the computing device, the IO Pump executing separately and distinctly from the application;
approximating bandwidth for the application;
allocating, via the IO Pump, multiple simultaneous Transmission Control Protocol (TCP) connections in support of the application based at least in part on the bandwidth approximation for the application; and
transmitting data from the computing device to a remote computing device on behalf of the application using multiple of the allocated TCP connections simultaneously by sending data on at least a first of the multiple of the allocated TCP connections while receiving data on at least a second of the multiple of the allocated TCP connections.

19. The non-transitory computer readable storage media of claim 18:
wherein the remote computing device comprises a server communicatively interfaced the computing device via a network; and
wherein each of the multiple simultaneous Transmission Control Protocol (TCP) connections constitute a single half-duplex TCP/IP capable connection enabled to, at any time, be transmitting data to the server via the network, or receiving data from the server via the network, or transmitting and receiving nothing, but cannot simultaneously be transmitting and receiving in both directions via any single half-duplex TCP/IP capable connection.

20. The non-transitory computer readable storage media of claim 18, further comprising
optimizing the transmitting in each of an outbound direction and an inbound direction based on a determined outbound potential bandwidth capacity and a determined inbound potential bandwidth capacity for the outbound and the inbound directions respectively, wherein optimizing the transmitting in each of an outbound direction and an inbound direction comprises one of:
optimizing the transmitting in support of improved quality for audio applications, wherein the application comprises an audio streaming application communicating with the remote computing device over a network;
optimizing the transmitting in support of improved quality for video applications, wherein the application comprises a video streaming application communicating with the remote computing device over the network;
optimizing the transmitting in support of improved quality for Voice over Internet Protocol (VoIP) applications, wherein the application comprises a VoIP application communicating with the remote computing device over the network;
optimizing the transmitting in support of improved quality for bi-directional audio streaming applications, wherein the application comprises a bi-directional audio streaming application communicating with the remote computing device over the network;
optimizing the transmitting in support of improved quality for screen sharing applications, wherein the application comprises a screen sharing application communicating with the remote computing device over the network; and
optimizing the transmitting in support of improved quality for web-cam audio/video applications, wherein the application comprises a web-cam audio/video application communicating with the remote computing device over the network.

21. The non-transitory computer readable storage media of claim 18, further comprising:
opening one or more of the multiple simultaneous TCP connections when there are TCP connections in a closed state available within a connection pool having the multiple simultaneous TCP connections therein; and
allocating additional simultaneous TCP connections into the connection pool in support of the application when each of three criteria are present, the three criteria comprising:
(1) all of the multiple simultaneous TCP connections in the connection pool are in a busy state,
(2) none of the multiple simultaneous TCP connections in the connection pool are in an available state, and
(3) none of the multiple simultaneous TCP connections in the connection pool are in the closed state.

22. A computing device comprising:
a processor to execute an application, the application being operable to communicate with a remote computing device over a public Internet;
the processor to further execute an Input/Output pump streaming platform ("TO Pump") at the computing device, the IO Pump to execute separately and distinctly from the application;
a regulator module to approximate bandwidth for the application;
the IO Pump to allocate multiple simultaneous Transmission Control Protocol (TCP) connections in support of the application based at least in part on the bandwidth approximation for the application; and
a network interface to transmit data from the computing device to a remote computing device on behalf of the application using multiple of the allocated TCP connections simultaneously by sending data on at least a first of the multiple of the allocated TCP connections while receiving data on at least a second of the multiple of the allocated TCP connections.

23. The computing device of claim 22, further comprising:
an exchanger of the I/O pump to queue pending request packets awaiting transmission from the computing device to the remote computing device within a task queue; and
wherein the exchanger to further match pending request packets in the task queue to one of the multiple simultaneous TCP connections within a connection pool having an available state to transmit the pending request packets to the remote computing device via the multiple simultaneous TCP connections.

24. The computing device of claim 22, wherein the application comprises an application type selected from the group comprising:
a real-time communications application;
a low latency communications application;
a Voice over Internet Protocol (VoIP) application;
an audio streaming application;
a video streaming application;
a bi-directional audio streaming application;
a video streaming application;
a screen sharing application; and
a web-cam audio/video application.

* * * * *